(12) United States Patent
Egorov et al.

(10) Patent No.: US 10,581,603 B2
(45) Date of Patent: *Mar. 3, 2020

(54) METHOD AND SYSTEM FOR SECURE DELEGATED ACCESS TO ENCRYPTED DATA IN BIG DATA COMPUTING CLUSTERS

(71) Applicant: ZeroDB, Inc., San Francisco, CA (US)

(72) Inventors: Mikhail Egorov, San Francisco, CA (US); MacLane Scott Wilkison, Mountain View, CA (US); David Nuñez, San Francisco, CA (US); Isaac Agudo, Malaga (ES)

(73) Assignee: ZeroDB, Inc., San Francisco, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/974,196

(22) Filed: May 8, 2018

(65) Prior Publication Data

US 2018/0254901 A1 Sep. 6, 2018

Related U.S. Application Data

(63) Continuation-in-part of application No. 15/588,614, filed on May 6, 2017.

(Continued)

(51) Int. Cl.
G06F 21/00 (2013.01)
H04L 29/06 (2006.01)
(Continued)

(52) U.S. Cl.
CPC .......... *H04L 9/0891* (2013.01); *G06F 21/602* (2013.01); *H04L 9/0637* (2013.01);
(Continued)

(58) Field of Classification Search
CPC ....... H04L 9/0891; H04L 9/30; H04L 9/0822; H04L 9/14; H04L 9/0894; H04L 9/0825; H04L 9/0637; G06F 21/602
See application file for complete search history.

(56) References Cited

U.S. PATENT DOCUMENTS

2007/0094719 A1\* 4/2007 Scarlata .................. G06F 21/53
726/9
2009/0216910 A1\* 8/2009 Duchesneau ......... G06F 9/5072
709/250
(Continued)

FOREIGN PATENT DOCUMENTS

WO 2015055762 A1 4/2015
WO WO-2016064691 A1 \* 4/2016 ........... H04L 9/3247

OTHER PUBLICATIONS

Xiaohui Liang, Zhenfu Cao, Huang Lin, Jun Shao; "Attribute based proxy re-encryption with delegating capabilities"; Mar. 2009; ASIACCS '09: Proceedings of the 4th International Symposium on Information, Computer, and Communications Security; ACM; pp. 276-286 (Year: 2009).\*

(Continued)

*Primary Examiner* — Shewaye Gelagay
*Assistant Examiner* — Courtney D Fields
(74) *Attorney, Agent, or Firm* — Pillsbury Winthrop Shaw Pittman, LLP

(57) ABSTRACT

Provided is a process including: encrypting each of a plurality of data encryption keys with a first public cryptographic key to form encrypted data encryption keys; obtaining a second public cryptographic key; generating a transformation key based on the first public-private cryptographic key pair and the second public cryptographic key; and transforming the encrypted data encryption keys with proxy re-encryption based on the transformation key; and obtaining the second private cryptographic key and the transformed encrypted data encryption keys.

24 Claims, 12 Drawing Sheets

Related U.S. Application Data

(60) Provisional application No. 62/503,005, filed on May 8, 2017, provisional application No. 62/332,840, filed on May 6, 2016.

(51) Int. Cl.

| | |
|---|---|
| *H04L 9/08* | (2006.01) |
| *H04L 9/14* | (2006.01) |
| *G06F 21/60* | (2013.01) |
| *H04L 9/30* | (2006.01) |
| *H04L 9/06* | (2006.01) |
| *G06F 21/62* | (2013.01) |
| *G06F 21/72* | (2013.01) |

(52) U.S. Cl.
CPC .......... *H04L 9/0822* (2013.01); *H04L 9/0825* (2013.01); *H04L 9/0894* (2013.01); *H04L 9/14* (2013.01); *H04L 9/30* (2013.01)

(56) References Cited

U.S. PATENT DOCUMENTS

| | | |
|---|---|---|
| 2011/0131222 A1 | 6/2011 | Dicrescenzo |
| 2014/0140514 A1 | 5/2014 | Gentry |
| 2014/0237234 A1 | 8/2014 | O'Connor et al. |
| 2015/0067330 A1 | 3/2015 | Khan et al. |
| 2015/0149427 A1 | 5/2015 | Kerschbaum et al. |
| 2015/0271153 A1 | 9/2015 | Rohloff et al. |
| 2016/0055347 A1 | 2/2016 | Park et al. |
| 2016/0234012 A1 | 8/2016 | Kawai et al. |
| 2017/0054716 A1 | 2/2017 | Egorov et al. |

OTHER PUBLICATIONS

ElGamal, T., "A Public Key Cryptosystem and a Signature Scheme Based on Discrete Logarithms" in Workshop on the Theory and Application of Cryptographic Techniques, Springer Berlin Heidelberg, https://people.csail.mit.edu/alinush/6.857-spring-2015/papers/elgamal.pdf, Aug. 1984, pp. 10 to 18.

Blaze et al., "Divertible Protocols and Atomic Proxy Cryptography" in International Conference on the Theory and Applications of Cryptographic Techniques, Springer Berlin Heidelberg, https://link.springer.com/content/pdf/10.1007%2FBFb0054122.pdf, May 1998, pp. 127-144.

Ateniese et al., "Improved Proxy Re-Encryption Schemes with Applications to Secure Distributed Storage" in ACM Transactions on Information and System Security (TISSEC), 9(1), 1-30, https://spqr.eecs.umich.edu/papers/ateniese-proxy-reenc-tissec.pdf, 2006, pp. 1 to 30.

Ateniese et al., "Improved Proxy Re-Encryption Schemes with Applications to Secure Distributed Storage" in Cryptology ePrint Archive, at 2005/028, https://eprint.iacr.org/2005/028.pdf, pp. 1 to 25.

Blaze et al., "Divertible Protocols and Atomic Proxy Cryptography", in Proceedings of Eurocrypt '98, vol. 1403, https://pdfs.semanticscholar.org/ff26/95513e7e0f49a0a484818c19b6346e076172.pdf, 1998, pp. 127-144.

Nuñez et al., "Delegated Access for Hadoop Clusters in the Cloud" in IEEE International Conference on Cloud Computing Technology and Science, 2014, pp. 374-379.

The Internet Archive capture of Apr. 20, 2017 of https://web.archive.org/web/20170420120155/https://kafka.apache.org/documentation/, pp. 1 to 108.

International Search Report and Written Opinion for Related PCT Application PCT/US2018/031614 dated Sep. 21, 2018, pp. 1 to 11.

"Transparent Encryption in HDFS", Apache Hadoop 2.7.3, https://hadoop.apache.org/docs/r2.7.3/hadoop-project-dist/hadoop-hdfs/TransparentEncryption.html, May 2, 2018, pp. 1 to 8.

Tsiounis et al., "On the Security of ElGamal Based Encryption", http://citeseerx.ist.psu.edu/viewdoc/download?doi=10.1.1.367.681&rep=rep1&type=pdf, 1998, pp. 1 to 18.

Dubey et al., "A Novel Approach for Information Security in Hadoop", International Journal of Computer & Mathematical Sciences vol. 6, Issue 6, pp. 1 to 6.

International Preliminary Report on Patentability in International Application No. PCT/US2018/031614 dated Nov. 12, 2019.

\* cited by examiner

METHOD AND SYSTEM FOR SECURE DELEGATED ACCESS TO ENCRYPTED DATA IN BIG DATA COMPUTING CLUSTERS

CROSS-REFERENCE TO RELATED APPLICATIONS

This patent claims the benefit of U.S. Provisional Patent Application 62/503,005, having the same title, filed 8 May 2017, and is a continuation-in-part of U.S. patent application Ser. No. 15/588,614, titled ENCRYPTION FOR DISTRIBUTED STORAGE AND PROCESSING, filed 6 May 2017, which claims the benefit of, U.S. Provisional Patent Application 62/332,840, titled ENCRYPTION FOR DISTRIBUTED STORAGE AND PROCESSING, filed 6 May 2016. The entire content of each earlier-filed application to which priority is claimed is hereby incorporated by reference for all purposes.

BACKGROUND

1. Field

The present disclosure relates generally to distributed computing and, more specifically, to encryption for distributed storage and processing applications.

2. Description of the Related Art

One class of cloud-computing involves clusters of computers that concurrently process very large sets of data, e.g., with Hadoop™, Spark™, Flink™, or Kafka™. Generally, these distributed processing frameworks or libraries distribute data among a set of computers (or other computational entities, like virtual machines or containers) in a cluster, often with redundant copies of the data being distributed among the computers, as often none of the computers are trusted to not fail during a process. Often these systems process data concurrently, e.g., with MapReduce, to make operations on large data sets feasible. Given the large number of computers often used, and often variable demand for those computers, many users execute these applications in the cloud.

Traditional implementations of this architecture can give rise to undesirable tradeoffs. Generally, various highly regulated businesses would like to move more of their data onto the cloud, but they need to know that the cloud provider cannot access their data. This generally is true both for cloud storage and cloud processing of data. Further, when implemented in a public cloud, it is likely that the same computer will have data from different users, as it might perform some tasks for user A and other tasks for user B, possibly concurrently in different virtual machines on the same computer. This gives rise a number of security concerns. Example attacks might attempt a buffer overflow on a machine to execute code that allows an attacker to then read records from other users on that machine.

To mitigate these problems, some distributed processing and storage applications have implemented encryption. Often, encryption is performed with symmetric encryption keys managed by a key management server, in some cases, co-located with the computing devices by which the distributed processing and storage application is implemented. For instance, Hadoop 2.x introduced Transparent Data Encryption (TDE), which provides symmetric key encryption to at rest for data operated upon or stored by the Hadoop implementation. These existing attempts, like TDE, to mitigate the problems above, however, often leave the encryption keys stored in the data center and widely distributed among computing nodes, leaving a large attack surface.

Other approaches to mitigate the problem above give rise to other challenges. Encryption keys could be stored remotely from the computing devices by which the distributed processing and storage application is implemented, e.g., in a zero-knowledge architecture, where encryption keys are stored on separate, often remote, trusted computers exclusively, and encrypted data is sent to those computers for processing. However, performance can suffer in distributed processing and storage applications, where there are often many, highly-distributed attempts to access encrypted data. Sending encrypted blobs to a remote trusted computer to be decrypted and sent back can be prohibitively slow when done too often or for data sets that are too large.

Similar problems arise with key rotation, where data is encrypted with a new set of keys in case the old set of keys is compromised. With some forms of zero-knowledge solutions, the data is sent to a remote trusted computer to be decrypted with the old key and re-encrypted with a new key during a key rotation. But this can be problematic for big data cloud-implemented applications. Many data centers bill based on bandwidth used, so uploading and then downloading data to and from a remote trusted computer that decrypts and encrypts the data can consume excessive bandwidth and impose a high overhead. Moreover, due in part to these challenges with managing keys in zero-knowledge implementation, many existing approaches do not provide for fine-grained access control to data in the distributed processing and storage application.

Further challenges arise from legacy code bases built around traditional systems. Often, it is expensive and cumbersome to re-work code to accommodate new encryption schemes that might otherwise mitigate some of the issues above. In many cases, hundreds or thousands of developer hours have been spent on an existing code base, and users are hesitant to modify their system in a way that causes them to discard a substantial portion of this work.

None of the preceding, or any discussion below of tradeoffs, should be taken as a disclaimer of claim scope, as various subsets of the present techniques may be used with systems suffering various subsets of the problems described herein while still conferring important benefits.

SUMMARY

The following is a non-exhaustive listing of some aspects of the present techniques. These and other aspects are described in the following disclosure.

Some aspects include a process including: obtaining, with one or more processors, a plurality of records associated with an encryption zone in a distributed application executing on a plurality of computing nodes; encrypting, with one or more processors, each of the plurality of records with a respective data encryption key among a plurality of data encryption keys to form a plurality of encrypted records; encrypting, with one or more processors, each of the plurality of data encryption keys with a first public cryptographic key to form encrypted data encryption keys, wherein: the first public cryptographic key is a member of a first public-private cryptographic key pair including the first public cryptographic key and a corresponding first private cryptographic key, the first public cryptographic key corresponds to the encryption zone, the distributed application comprises a trusted portion and an untrusted portion, the first private cryptographic key is unavailable to the untrusted portion of the distributed application, and the first private cryptographic key is available to at least part of the trusted portion of the distributed application; obtaining, with one or more processors, a second public cryptographic key in the trusted portion of the distributed application, wherein: the second public cryptographic key is a member of a second public-private cryptographic key pair including the second public cryptographic key and a corresponding second private cryptographic key, and the second public-private cryptographic key pair is different from the first public-private cryptographic key pair; generating, with one or more processors, a transformation key based on the first public-private cryptographic key pair and the second public cryptographic key, wherein the transformation key is generated in the trusted portion of the distributed application; transforming, with one or more processors, the encrypted data encryption keys with proxy re-encryption based on the transformation key to form transformed encrypted data encryption keys, wherein: the transformed encrypted data encryption keys are decryptable with the second private cryptographic key, and the encrypted data encryption keys are not decryptable with the second private cryptographic key; obtaining, with one or more processors, the second private cryptographic key and the transformed encrypted data encryption keys in the untrusted portion of the distributed application; decrypting, with one or more processors, in the untrusted portion of the distributed application, a first transformed encrypted data encryption key among the transformed encrypted data encryption keys to obtain a first data encryption key among the plurality of data encryption keys; and decrypting, with one or more processors, in the untrusted portion of the distributed application, a first encrypted record among the plurality of encrypted records with the first data encryption key.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
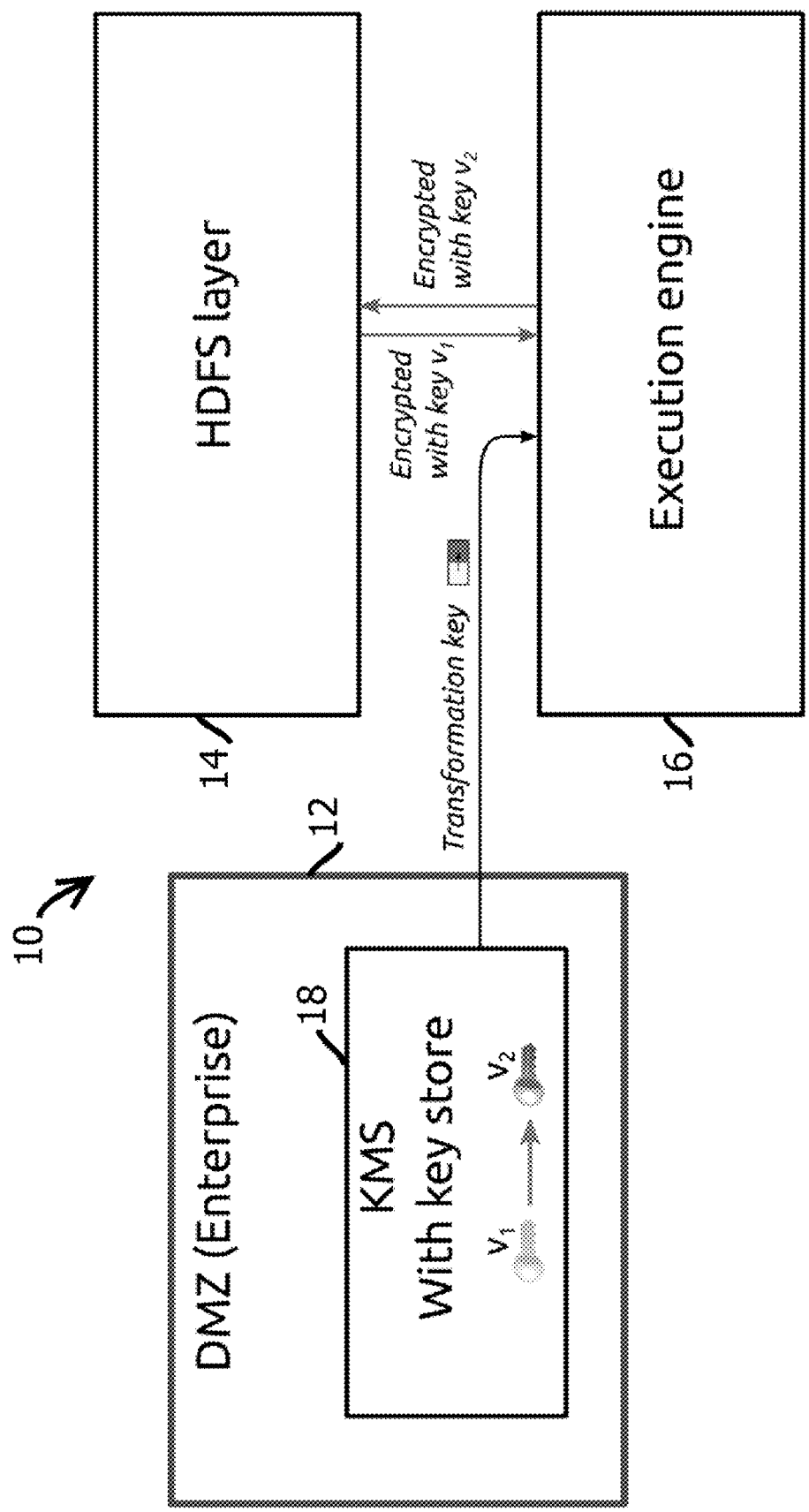
FIG. 1 shows an example of a logical architecture of a distributed processing and storage application performing key rotation in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and cryptography. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Classes of embodiments are described below in two sections. Generally, embodiments applying proxy re-encryption in big data distributed applications are described first, with reference to FIGS. 1-6, and the embodiments implementing those techniques along with refinements that, in some cases, afford transparent retrofitting of legacy big data applications and finer grained control of access than is afforded with traditional encryption zones is described subsequently, with reference to FIGS. 5-12.

As noted, many existing approaches to encrypting data in distributed storage and processing applications do not adequately address key rotation. Old ways of doing this often involve transferring the data to a trusted computer and then decrypting the data with the old key and then re-encrypting the data with the new key. But this is slow when the data is in the cloud and a user is trying to keep the untrusted cloud in a zero-knowledge state. And cloud providers often charge for network bandwidth used to upload and download the data. (None of which is to suggest that such approaches are disclaimed or cannot be used in conjunction with the present techniques.)

One approach to mitigate this issue with key rotation for cloud-hosted encrypted data is use of hybrid encryption systems, where data is encrypted with a key (e.g., a symmetric key where the same secret value is used by encrypt the data and then decrypt the data), that key is then itself encrypted, and the encryption by which the key is accessed is subject to key rotation. This approach mitigates the problem above when the number of encryption keys is relatively small. But this approach often does scale to the number of keys needed for fine-grained allocation of selective access to data, e.g., where different data is encrypted with different keys, and then those different keys are distributed to entities authorized to access the subset of the data encrypted with that key. In these architectures, the volume of data consumed by just the keys can be relatively large, and the issues discusses above re-emerge as the data is subdivided into finer-grained segments with different keys. Such systems may have a huge number of symmetric keys to process (e.g., in some cases, more data than is encrypted in the first place).

To mitigate this problem, some embodiments use proxy re-encryption to implement a form of key rotation. Some embodiments: 1) generative a new (replacement) public/private key pair; 2) create a transformation key with proxy re-encryption based on the old public key and the new public key; 3) instruct the untrusted computers in the cloud to encrypt the data with the transformation key, so that the new private key can read the data and the old private/public key can be deleted. Of note, in some embodiments, the data is transformed without downloading the data to a trusted computer, on the untrusted computers of a public cloud, and without the untrusted computers having the data owner's private key by which they can access the full set of data.

Further, the proxy re-encryption techniques are used in some embodiments to selectively grant access on a relatively fine-grained basis. Embodiments have different pieces of data encrypted with different derived keys, allowing different entities (e.g., processes or jobs in Hadoop) to access different subsets of the data. For example, use cases may have a table with a billion rows and 200 columns, and a user may request an analysis in Hadoop™ on only 2 of those columns. In this scenario, some embodiments may implement different keys for just those two columns and only use those two keys for the task, leaving the rest of the data unexposed and reducing the system's attack surface.

Operations are described with reference to ciphertext and plaintext. In some cases, the plaintext may be workload data of the distributed processing and storage application (e.g., application state of the job being run), or the plaintext may be an encryption key (e.g., encrypted data encryption keys (EDEKs)) by which that workload data is encrypted. In some embodiments, for performance reasons, a symmetric key may be used to encrypt the workload data (e.g., a secret accessible to both sides), and the symmetric key may be conveyed with asymmetric key encryption (e.g., one side only knows the public key of the other side, who uses their private key to read the value encrypted with their public key, e.g., the symmetric key), which is then used to access the workload data.

A variety of proxy re-encryption algorithms may be used. Examples include those described in the following: Giuseppe Ateniese, Kevin Fu, Matthew Green, and Susan Hohenberger, "Improved Proxy Re-Encryption Schemes with Applications to Secure Distributed Storage," *Cryptology ePrint Archive*, at 2005/028; M. Blaze, G. Bleumer, and M. Strauss, "Divertible protocols and atomic proxy cryptography," *In Proceedings of Eurocrypt '98*, volume 1403, pages 127-144, 1998; and D. Nu nez, I. Agudo, and J. Lopez, "Delegated Access for Hadoop Clusters in the Cloud," *IEEE International Conference on Cloud Computing Technology and Science* (CloudCom 2014), pp. 374-379, 2014, the contents of each of which are hereby incorporated by reference.

As noted, Apache Hadoop 2.x introduced Transparent Data Encryption [TDE]. TDE provides symmetric encryption at rest for Hadoop File System (HDFS). Encryption at rest is an important measure for data security and compliance with PCI DSS, HIPAA, FICMA and other regulations.

Unfortunately, standard TDE falls short in many aspects:

TDE generally supports only symmetric encryption (AES). This means that every time partners are used as data sources, they have to ask the system's Key Management System (KMS) to encrypt data encryption keys (DEKs). Which means that the KMS has to be online all the time.

Symmetric encryption can only be AES in unauthenticated CTR mode. This means that your data can be corrupted or deliberately changed while encrypted without you knowing.

When the system analyzes the data, all the nodes which access that data constantly talk to the KMS. This means that the KMS should always be online, be very close to the Hadoop cluster and to be able to handle large numbers of requests per second. These requirements are very expensive or impossible to satisfy effectively if the desire is to keep KMS and encryption keys on premise. Hadoop deployed in a remote cloud with keys on premise will be simply slow.

Key rotation is very hard to perform because systems cannot employ the Hadoop cluster for this task as it would expose old and new secret keys to all the machines in the cluster. Key rotation is not supported in Hadoop KMS (as well as Key Trustee KMS and Ranger KMS), manual workarounds are slow or insecure. But key rotation every 1-12 months is desirable for security, compliance with regulations and internal policies.

Some embodiments implement one of more of the techniques described herein to secure Hadoop™ or other distributed processing and storage applications, mitigating the above challenges in the following ways:

Some embodiments support public key cryptography for encryption zones. In some cases, computational overhead in addition to AES is minimal.

As a block cipher, some embodiments can use AES256 in authenticated GCM mode.

Some embodiments delegate access to compute nodes in a cryptographically secure way using proxy re-encryption [PRE]. As a result, in some cases, compute nodes do not have to talk to the KMS while performing a job, so it does not matter how far the KMS is located from the cluster and whether the KMS can handle many simultaneous requests.

Key rotation with some embodiments is executed relatively quickly, e.g., less than a minute, less than 10 seconds, and in some cases, less than a second. To effectuate key rotation, some embodiments use proxy re-encryption to delegate data to the system's "future" self.

An example of a logical architecture 10 consistent with some embodiments is shown in FIG. 1. Some embodiments include a demilitarized zone (DMZ) 12 (an example of a trusted portion of the illustrated distributed application, outside of which is an example of an untrusted portion), a Hadoop file system (HDFS) layer 14, and an execution engine 16, each of which may communicate with one another via one or more networks, such as a secure local area network or in some cases, the Internet, using protocols such as Internet Protocol (IP) and Transport Control Protocol (TCP). In some cases, the DMZ hosts a key management server (KMS) 18 with a key store having a plurality of encryption keys by which data is encrypted in the HDFS, e.g., by the data owner.

In some cases, the HDFS layer may distribute workload data across a plurality of computing nodes on a plurality of computing devices, with data stored redundantly on different computing devices in case one device fails. Other embodiments may use other distributed filesystems, like PVFS, Lustre, or GFS. Some embodiments may store filesystem metadata and workload (application) data separately, e.g., with the metadata stored on a NameNode and workload data stored on DataNodes. The NameNode may store a filesystem namespace tree hierarchy and a mapping of data blocks to the DataNodes. Some embodiments may include a single NameNode and more than 10, more than 100, or more than 1,000 DataNodes.

In some cases, the execution engine 16 may perform operations on the workload data specified in a job, such as mapping operations or reducing operations. In some embodiments, the execution engine is MapReduce or Tez™. Some embodiments may perform mapping operations in which filtering or sorting is performed concurrently on different subsets of the workload data by different computing nodes. Some embodiments may perform reducing operations by which the results of the mapping operations are aggregated or otherwise summarized, e.g., again with concurrent operations on different subsets of the results with different computing nodes in a cluster.

In some embodiments, these features may be implemented within the distributed processing and storage application described herein, using a plurality of the computing devices described with reference to FIG. 7, e.g., in a public or private cloud data center. Some embodiments secure a Hadoop™ distribution in such a way that, if an attacker hacks into any instance of the cluster, the attacker cannot gain anything beyond the information which the compromised instance is currently computing on. Moreover, unlike traditional TDE, some embodiments do not introduce any noticeable slowdown to jobs, no matter how far from the Hadoop deployment the encryption keys are stored. And some embodiments also provide near-instant key rotation.

In brief, some embodiments configure nodes in a Hadoop cluster to work on workload data without talking to the KMS (e.g., a remote KMS used in traditional Hadoop deployments). The DMZ, in some embodiments, generates temporary keys for some or all of the nodes and produces transformation keys for the HDFS layer, so that HDFS can transform selected data from being encrypted for the data owner into being encrypted for compute nodes. In some embodiments, the number of ciphertexts accessible with a different encryption key (e.g., EDEK's or other data owner keys) is relatively voluminous, such that fine-grained access may be granted to the different ciphertexts without granting access to the other ciphertexts. In some embodiments, the volume of such keys may be comparable to that of the data itself, in the extreme case with one or more keys per entry per field of data. In some embodiments, the volume of keys (e.g., measured in bytes) may be more than 2% that of the data encrypted with the keys, more than 5%, more than 20%, more than 50%, more than 80%, or more than 100%, depending on the resolution with which access (e.g., the ability to decrypt) is granted.

In some embodiments, cluster nodes do not need to send anything to the remote KMS, nor do they need to interact with the remote KMS while the job is executed. In some cases, the remote KMS may store private and public keys by which a data owner's data is encrypted. In some cases, an intermediary KMS described below may access and store these public keys to form transformation keys or temporary access keys described below.

Proxy re-encryption [PRE] a the cryptogaphic primitive by which some embodiments secure Hadoop in a more manageable manner than traditional approaches. PRE is a family of public key encryption algorithms, the first of which was introduced in 1998. In addition to usual functions for encryption and decryption, proxy re-encryption provides access delegation, so that a completely different private key can decrypt your data.

An explanation of proxy Re-encryption in Python-like pseudo-code follows. The preamble ">>>" indicates entry of a command and the absence of ">>>" indicates the response to the command.

Data owner has his own key pair:
>>>private_key=get_random_key( )
>>>public_key=get_public_key(private_key)

Data is encrypted under the owner's public key, as is typical in public key cryptography:
>>>e_data=encrypt(public_key, data)

And the owner can decrypt it:
>>>data==decrypt(private_key, e_data)
True

Now, if a completely random person or process (e.g., an attacker) has its very own key pair, it cannot decrypt data encrypted under public_key:
>>>private key_2=get_random_key( )
>>>public_key_2=get_public_key(private_key_2)
>>>private_key_2==private_key
False
>>>decrypt(private_key_2, e_data)
DecryptionError: Wrong key But the owner of the data can enable the owner of a second key to read the data:
>>>t_key=get_transformation_key(private_key, public_key_2)

After that, in some embodiments, this transformation key t_key can be used to transform data where it is stored, e.g., without exposing any secret keys:
>>>data==transform(t_key, e_data)

And then owner of private_key_2 can decrypt the data:
22 >>data ==decrypt(private_key_2, e_data_2)

Figure 2:
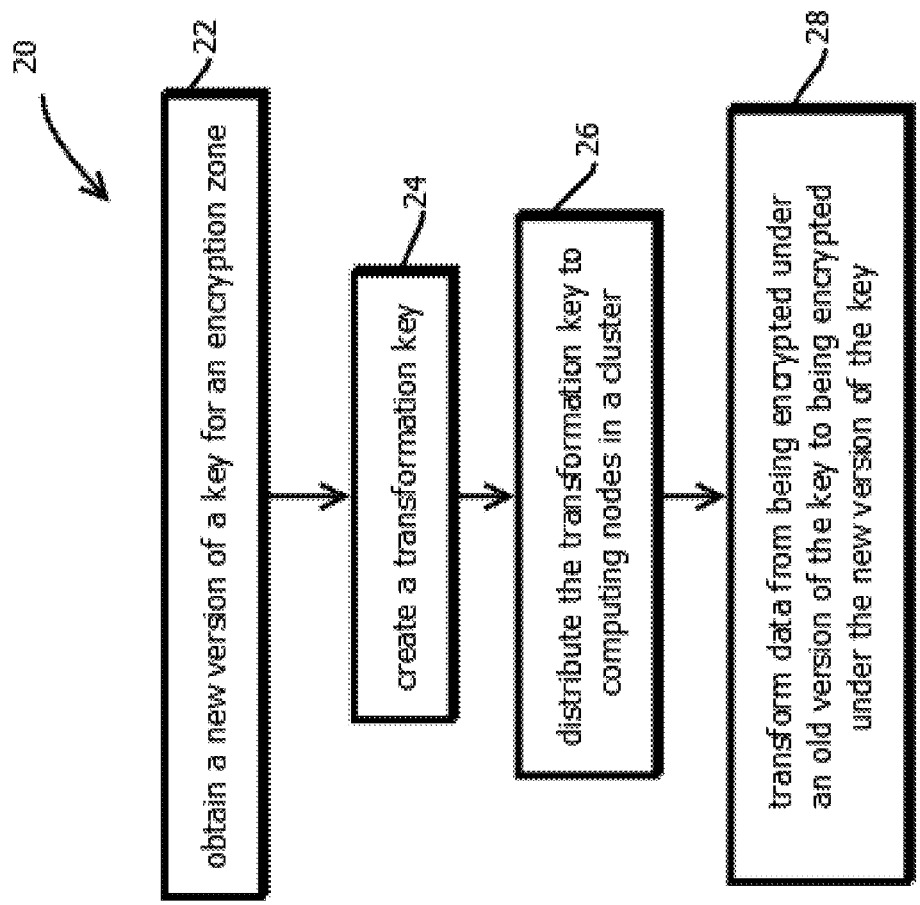
FIG. 2 shows an example of a process for key rotation that may be performed with a logical architecture of FIG. 1 in accordance with some embodiments of the present techniques.

FIG. 2 shows an example of a process 20 by which key rotation is achieved, e.g., with the architecture of FIG. 1. In some embodiments, key rotation is relatively manageable once the insights described herein are implemented. After a new version of a key for an Encryption Zone is introduced (block 22), in some embodiments, the KMS creates a transformation key (block 24), which after being distributed to computing nodes of a cluster (block 26), allows an untrusted party (e.g., the computing nodes) to transform data from being encrypted under an old version to a new version of the key (block 28). In other words, the user shares their own data with their future self with proxy re-encryption.

Then, in some embodiments, the transformation key is given to the cluster. And the whole cluster is employed for doing key rotation. A typical 1000-node cluster can perform key rotation at a speed of 2 petabytes per second. During this process, in some embodiments, no encryption keys are exposed to the Hadoop deployment and the data is never decrypted. (Of course, hybrid implementations are also envisioned in which the present techniques are used alongside traditional approaches, and some data may be decrypted in the portions implementing the traditional approach.)

Some embodiments include a key management server (KMS) 18 that affords delegated access and is distinct from the Hadoop KMS, e.g., some embodiments may include two KMSs, with the present KMS sitting between the Hadoop KMS and computing nodes of the distributed storage and processing application, or some embodiments may replace the Hadoop KMS with the present KMS.

Figure 3:
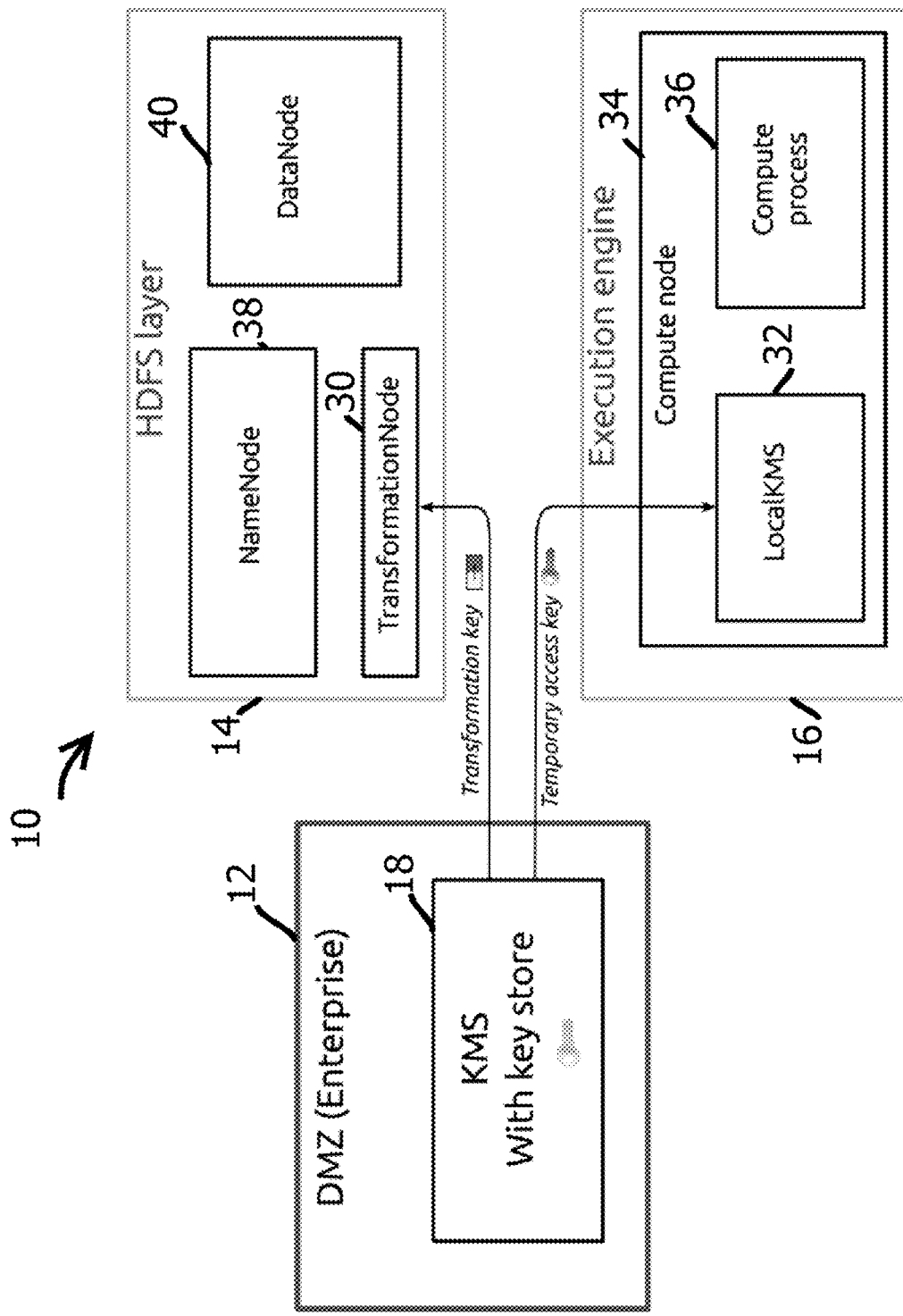
FIG. 3 shows an example of the logical architecture of FIG. 1 with greater detail depicting an example of delegated access being provided in accordance with some embodiments of the present techniques.

As shown in FIG. 3, unlike the typical Hadoop KMS, some embodiments have a KMS that communicates with the Hadoop cluster (e.g., by sending keys needed to access data) only when the KMS grants the permissions to execute the job being processed by the cluster in a cryptographically secure manner. In some cases, as shown in FIG. 3, these operations may be implemented with a TransformationNode 30 added to the HDFS layer and a LocalKMS 32 in the computing nodes 34 in support of computing processes 36, like mapping operations and reducing operations. As illustrated, and discussed above, the HDFS layer may include a NameNode 38 and DataNode 40 by which ciphertexts are accessed with the TransformationNode 30 and the computing node 34. Some embodiments may include substantially more computing nodes, e.g., more than 10, more than 100, or more than 1,000.

Before the cluster (of computing nodes constituting a Hadoop cluster in an instance of a distributed processing and storage application) executes the job (e.g., pipeline of one or more MapReduce operations on workload data), in some embodiments, the Key Management System 18 generates temporary encryption key pairs for some or all computing nodes in the cluster that will perform tasks in the job (e.g., with each node having its individual key pair (for instance, a public and private key in a public key encryption algorithm), and with different computing nodes having different key pairs). These temporary key pairs, in some embodiments, are transferred to the nodes 34 of the execution engine 16 over the network, e.g., with the transfer being secured by Transport Layer Security (TLS) communications between the KMS 18 and the nodes of the execution engine 16.

For each of those key pairs, in some embodiments, a transformation key is generated to grant permission to decrypt the data. These transformation keys may be deployed in the HDFS layer, e.g., by writing the key to designated locations in the distributed file system, in some cases, with keys being written to local memory of a computing node that will use the respective keys to access the data local to that computing node and perform operations on that data, or in some cases, the data or keys may be stored on a different computing node.

In some embodiments, when a node requests data from HDFS, blocks and files appear to the distributed processing and computing application as if they were encrypted under the node's temporary public key, e.g., in a manner that maintains compliance with the distributed processing and computing application's application program interface and data model. To maintain such compliance, while storing the data in a different format from that expected, HDFS layer nodes may transformed/re-encrypt the data prior to sending it to the execution engine, without having access to the encryption keys.

Figure 4:
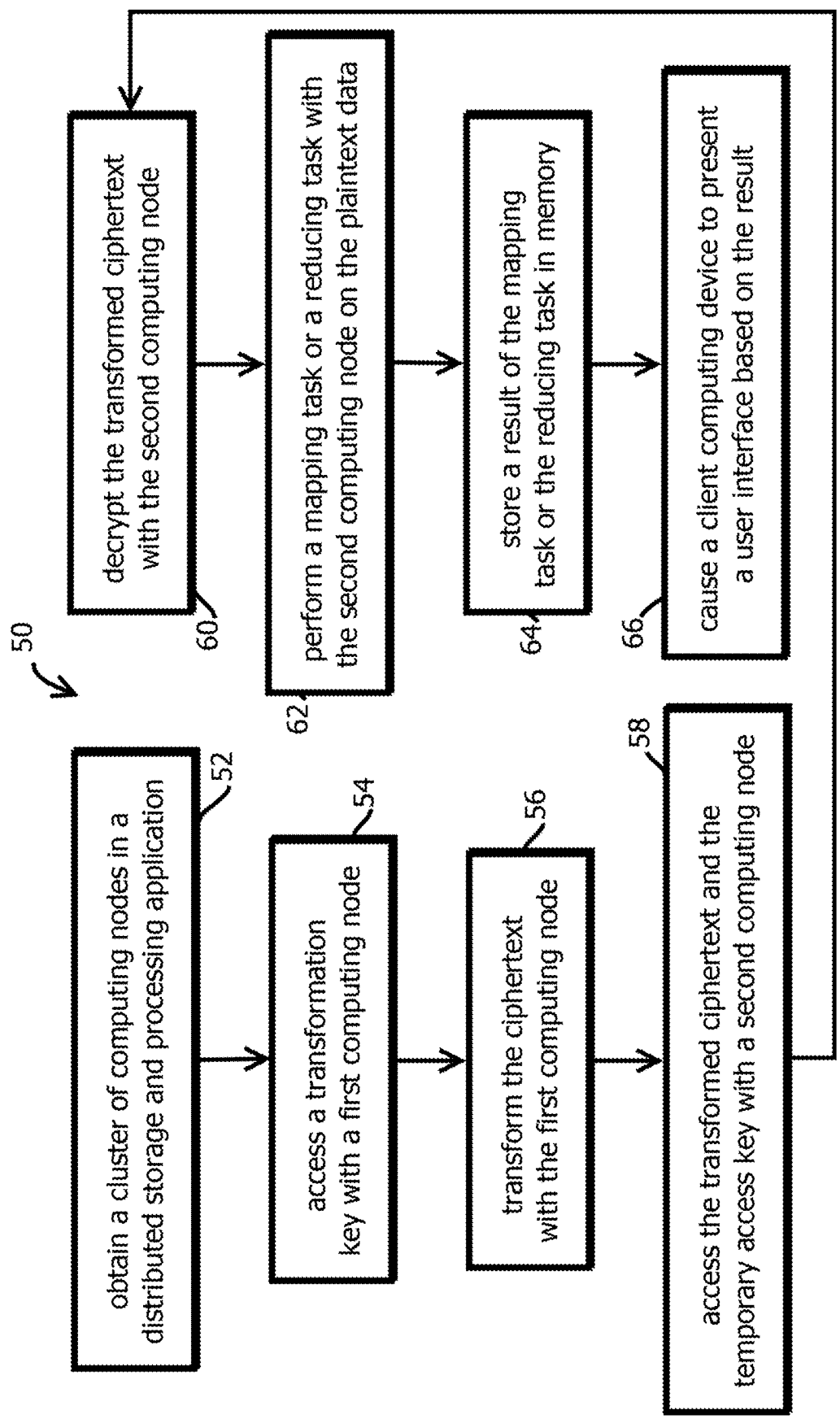
FIG. 4 shows an example of a process by which relatively fine-grained access to different subsets of encrypted data is provided with delegated access like that of FIG. 3 in accordance with some embodiments of the present techniques.

FIG. 4 shows an example of a process 50, which may be executed by the logical architectures described herein, to provide relatively fine-grained access control using the delegated access features discussed above. In some embodiments, the process 50 includes obtaining a cluster of computing nodes in a distributed storage and processing application, as indicated by block 52. In some cases, this may include one or more of the distributed storage and processing applications described herein, and in some cases, obtaining the cluster, may be performed by obtaining access to a cluster hosted on a remote data center.

Some embodiments include accessing a transformation key with a first computing node, as indicated by block 54. In some cases, accessing the transformation key may include accessing one of the above-described key management servers discussed above, such as a key management server operative to provide a transformation key for a proxy re-encryption algorithm like those discussed above.

Some embodiments include transforming the ciphertext with the first computing node, as indicated by block 56. In some cases, the ciphertext is workload data stored in one of the above-described data nodes, for instance, ciphertext formed with data encrypted with a data owner's encryption key or with one of the above-described key rotation keys. In some embodiments, transforming the ciphertext with the first computing node may include transforming the ciphertext with the transformation key, for example, based upon a public key of a second computing node discussed below. In some embodiments, the transformation may be performed without access to a private key by which the ciphertext is encrypted and without access to a private key corresponding to a public key of the second computing node. In some embodiments, the transformation may be performed without the first computing node having access to the unencrypted plaintext form of the ciphertext.

Some embodiments may access the transformed ciphertext and the temporary access key with a second computing node, as indicated by block 58. In some cases, the second computing node is a worker node in a computing cluster executing one of the above-described computing processes 36. In some cases, the temporary access key is accessed with a local key management server 32 like that discussed above. In some cases, the transformed ciphertext is accessed with the read operation described below with reference to FIG. 5, For instance by interfacing with the above-described NameNode 38 to identify which DataNode 40 that stores the transformed ciphertext.

Next, some embodiments may decrypt the transformed ciphertext with the second computing node, as indicated by block 60. In some cases, these operations 58-64 may be performed concurrently, for example, by more than 10, more than 100, or more than 1000 different computing nodes that serve the role of the second computing node. Similarly, the operations of block 54 and 56 may be executed concurrently, for instance, by different instances of the TransformationNode 30 described above.

Next, some embodiments may perform a mapping task or a reducing task with the second computing node on the plaintext data, as indicated by block 62.

Next, some embodiments may store a result of the mapping task or the reducing task in memory, as indicated by block 64. In some cases, this may include the below-described write operations of FIG. 12. In some embodiments, a sequence of mapping, then reducing, then mapping, then reducing tasks, and so on, the repeated, for example, in a pipeline.

Some embodiments may use the result of the MapReduce job for a variety of purposes. In some cases, the resulting data may be subject to further transformations, and some embodiments may cause a client computing device to present user interface based on the result, as indicated by block 66. In some cases, the client computing device may present a user interface in a web application or a native mobile application or desktop application.

In some embodiments, delegated access may be granted with relatively fine-grain control, for example, with different encryption keys being allocated to different computing nodes, such that the different computing nodes may access a subset of the present ciphertexts. For example, some embodiments may permit a given computing node to access a single column, or a single value of a single field with a single temporary access key suitable for that computing node (and only that computing node having a corresponding private key) to access that one and only value, or embodiments may group subsets of data in different ways, for example, by column, by row, by table, or the like, and provide access based upon these different subsets of data. Some embodiments may generate keys to access different subsets of data, such as the temporary access keys, for limited use, for example, on a job-by-job basis or on a task by task basis. In some cases, a given computing node may become compromised, but an adversary a may be prevented from accessing the full set of data based upon the above-describe segmentation with different encryption keys applying to different subsets of these ciphertext.

When HDFS clients read data encrypted with a block cipher and data encryption keys encrypted with a zone key (EDEKs) [TDE], they typically use the KeyProvider API to ask Hadoop KMS to decrypt EDEKs.

In contrast, with some embodiments, EDEKs are instead transformed by TransformationNodes to EDEK2 and sent for decryption to a local daemon (LocalKMS), which in some cases, provides the same KeyProvider API. The LocalKMS daemon may decrypt EDEK2 with the temporary private key it holds (after EDEKs are transformed by the HDFS layer) and give data encryption keys (DEKs) back to the local HDFS client that requested them.

In some embodiments, the HDFS client then uses DEKs to decrypt the data encrypted by the block cipher, similar to standard transparent data encryption.

By way of comparison, it is worth examining the sequence of events for reading an encrypted with both TDE (the standard Hadoop approach) and embodiments of the present techniques.

The sequence of events for reading an encrypted file with TDE includes the following:
 1. The HDFS client calls open( ) to read a file.
 2. The NameNode provides the EDEK to the client
 3. The HDFS client passes the EDEK and EZK-id/version to the KMS.
 4. The KMS requests the EZK from the key server.
 5. The KMS decrypts the EDEK using the EZK.
 6. The KMS provides the DEK to the HDFS client.
 7. The HDFS client reads the encrypted data blocks, decrypting them with the DEK.

Figure 5:
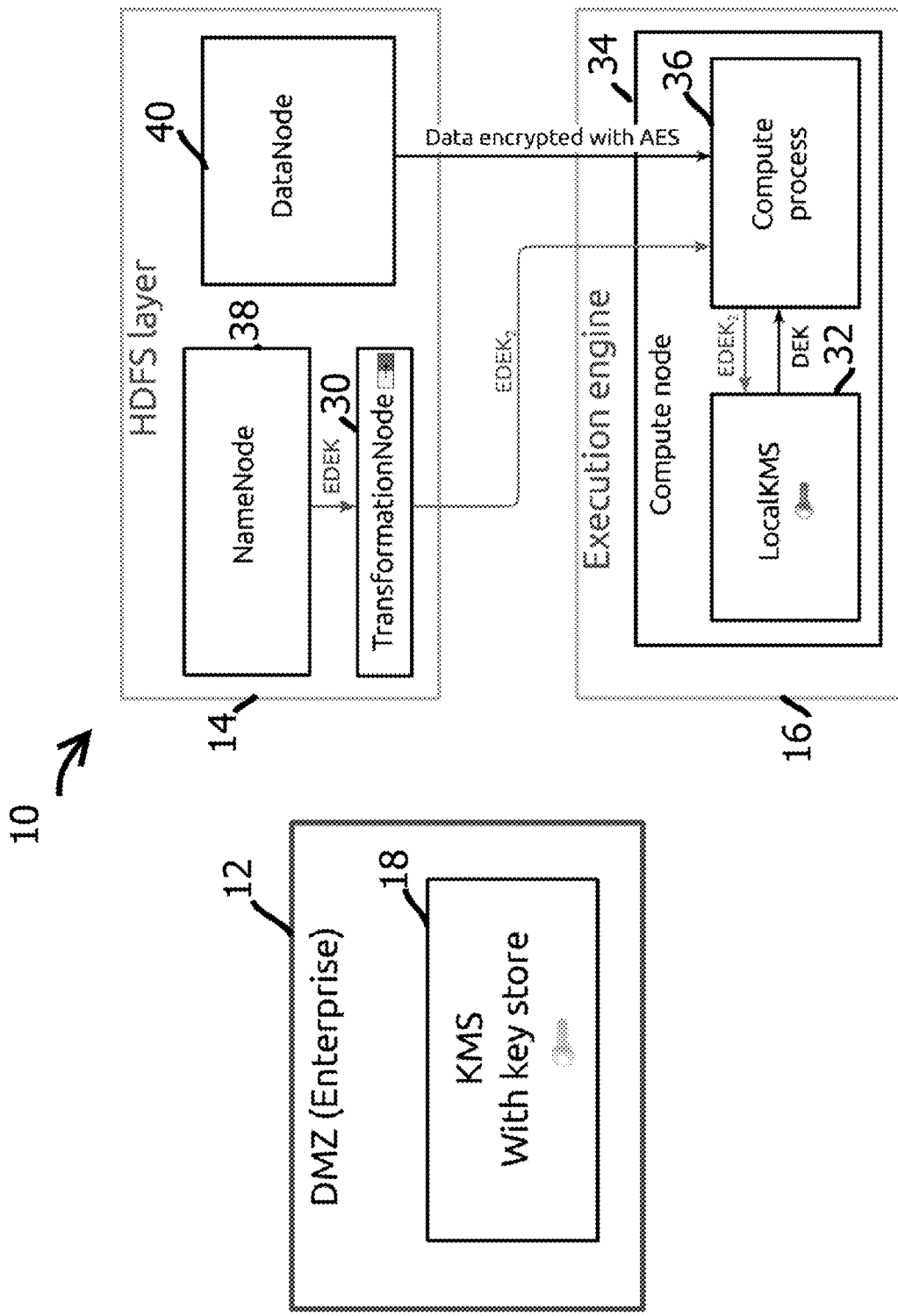
FIG. 5 shows the logical architecture of FIG. 1 with greater detail illustrating a read operation in accordance with some embodiments of the present techniques.

In contrast, the sequence of events for reading an encrypted file with embodiments of the present techniques are shown in FIG. 5 and include the following:
 1. Before any reading happens, KMS gives transformation key to TransformationNode, generates and gives temporary key to LocalKMS.
 2. The HDFS client calls open( ) to read a file.
 3. The EDEK provided by NameNode is proxied and transformed by TransformationNode.
 4. The HDFS client passes the EDEK and EZK-id/version to the LocalKMS.
 5. The LocalKMS decrypts the EDEK using its temporary key.
 6. The LocalKMS provides the DEK to the HDFS client.
 7. The HDFS client reads the encrypted data blocks, decrypting them with the DEK.

In some embodiments, when an HDFS client writes data to HDFS, LocalKMS generates a random data encryption key (DEK), which the client uses to encrypt data with a block cipher algorithm (typically AES). If this node is allowed to save data to HDFS, the KMS of some embodiments gives LocalKMS the public key for the Encryption Zone. LocalKMS may encrypt DEK using this public key to produce an EDEK, and this EDEK gets transferred to a NameNode in the HDFS layer. There is no need for the HDFS cluster to communicate with the KMS of the present embodiment during this process.

By way of comparison, it is worth examining the sequence of events for writing an encrypted file with both TDE and embodiments of the present techniques.

The sequence of events for writing an encrypted file with TDE includes the following:
 1. The HDFS client calls create( )to write to the new file.
 2. The NameNode requests the KMS to create a new EDEK using the EZK-id version.
 3. The KMS generates a new DEK.
 4. The KMS retrieves the EZK from the key server.
 5. The KMS encrypts the DEK, resulting in the EDEK.
 6. The KMS provides the EDEK to the NameNode.
 7. The NameNode persists the EDEK as an extended attribute for the file metadata.
 8. The NameNode provides the EDEK to the HDFS client.
 9. The HDFS client provides the EDEK to the KMS, requesting the DEK.
 10. The KMS requests the EZK from the key server.
 11. The KMS decrypts the EDEK using the EZK.
 12. The KMS provides the DEK to the HDFS client.
 13. The HDFS client encrypts data using the DEK.
 14. The HDFS client writes the encrypted data blocks to HDFS.

Figure 6:
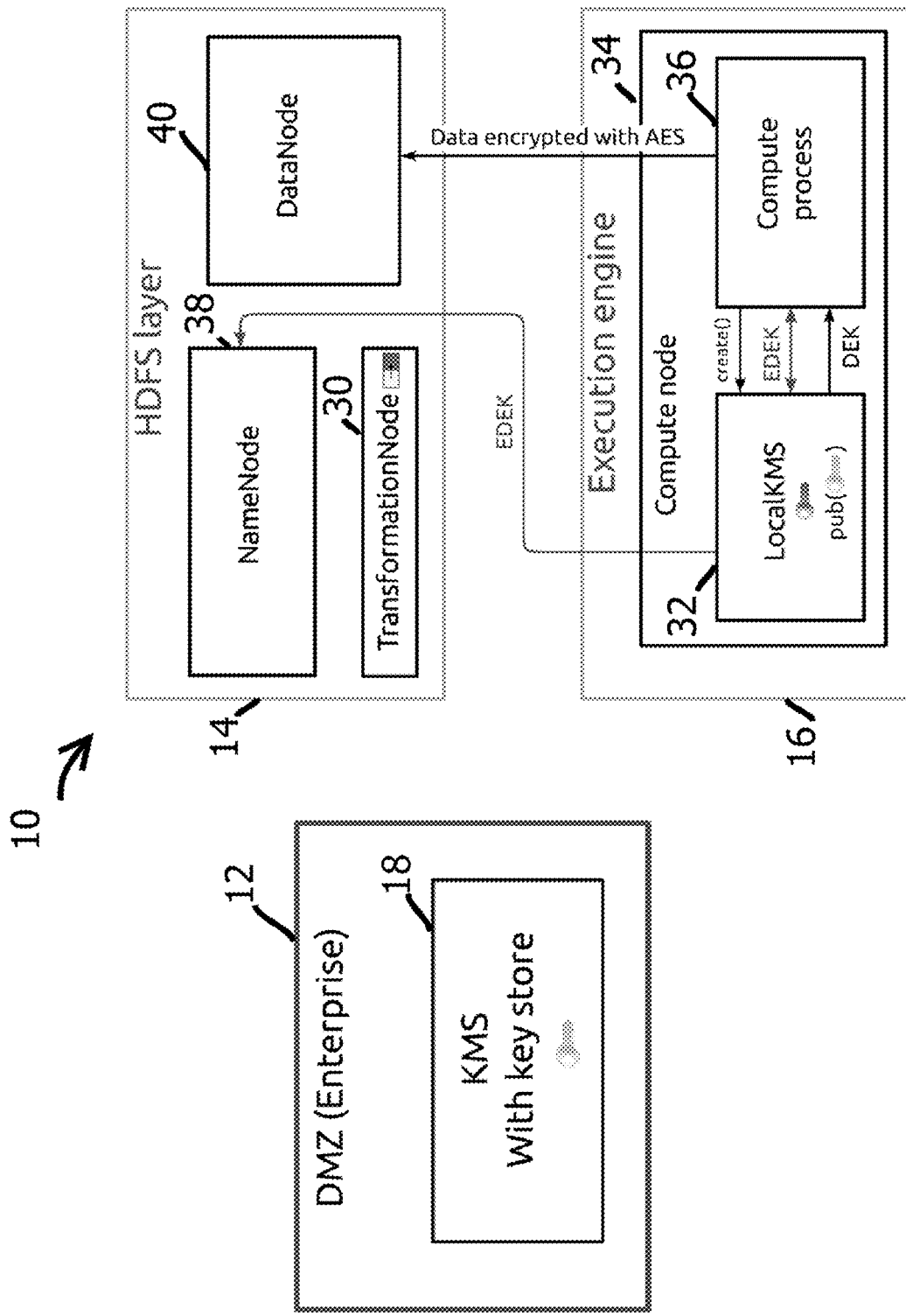
FIG. 6 shows the logical architecture of FIG. 1 with greater detail illustrating a write operation in accordance with some embodiments of the present techniques.

In contrast, the sequence of events for writing an encrypted file with embodiments of the present techniques are shown in FIG. 6 and include the following:
 1. Before any writing happens, KMS gives LocalKMS public key for encryption zone.
 2. The HDFS client calls create( ) to write to the new file.
 3. LocalKMS on the same node as HDFS client generates new DEK.
 4. LocalKMS encrypts DEK with the EZ public key.
 5. LocalKMS provides EDEK to the NameNode.
 6. The NameNode persists the EDEK as an extended attribute for the file metadata.
 7. LocalKMS provides the EDEK to the HDFS client.
 8. The HDFS client provides the EDEK to the LocalKMS, requesting the DEK.
 9. LocalKMS gives back DEK it just encrypted to the HDFS client.
 10. The HDFS client encrypts data using the DEK.
 11. The HDFS client writes the encrypted data blocks to HDFS.

Operations are described with reference to ciphertext (the encrypted form of data) and plaintext (the unencrypted form of data, which may still be encrypted in cases where multiple layers of encryption are applied). In some cases, the plaintext may be workload data of the distributed processing and storage application (e.g., application state of the job being run), or the plaintext may be an encryption key (e.g., encrypted data encryption keys (EDEKs)) by which that workload data is encrypted. In some embodiments, for performance reasons, a symmetric key may be used to encrypt the workload data (e.g., a secret accessible to both sides), and the symmetric key may be conveyed with asymmetric key encryption (e.g., one side only knows the public key of the other side, who uses their private key to read the value encrypted with their public key, e.g., the symmetric key), which is then used to access the workload data.

In some embodiments, the above techniques may be implemented as described with reference to the following embodiments.

As mentioned, many companies (and governments and other entities) are hesitant to move their data into the cloud or expose their data to could-based big data analytics tools. A significant barrier to adoption is security of both the data storage and analytics platform and the cloud. Organizations are increasingly concerned with the risk and cost of unending cyberattacks. Perimeter security plays an important role, but is often insufficient on its own. The ultimate protection against attacks is encryption at the data layer (e.g., both at rest and in transit). As malicious attacks have become more sophisticated, the ability to protect and regularly rotate encryption keys, while at the same time providing access to authorized users and partners, is a powerful tool for delivering against this mandate. (Though, it should be emphasized that multiple inventions are described herein, with different tradeoffs, so embodiments are not limited to systems affording this benefit, which is not to suggest that any other description is limiting.)

A common theme in many big data storage and analytics software tools is distributed processing and resiliency to the failure of any one computational entity, often with redundancy and fault-tolerant algorithms. Examples are described with reference to Apache Hadoop™, but the present techniques can be applied in a variety of other big data applications, including Apache Spark™, Apache Flink™, Apache Storm™, Apache Samza™, Cluster MapReduce, High Performance Computing Cluster, Hydra™, Ceph™, DataTorrent RTS™, Disco™, BigQuery™, Pachyderm™, Presto™, and the like. Many facing the challenges above would like to use these tools, but the same aspects that make the tools powerful for big data problems increase the attack surface for malicious actors. To mitigate these issues, some embodiments deploy certain cryptographic techniques in the context of these tools.

Apache Hadoop is a processing framework for big data repositories. Details are described at http://hadoop.apache.org/docs/current/, the contents of which under the headings "General," "Common," and "HDFS," and "MapReduce," in the Internet Archive capture of 14 Feb. 2017 are hereby incorporated by reference. Hadoop uses the MapReduce paradigm, which spreads the workload across the whole cluster in two distinct phases: (i) Map, where each data record is processed and an intermediate result is produced, (ii) and Reduce, where several intermediate results are merged into single outputs. This paradigm is very powerful since it scales very well and it is robust to node failures. Although Hadoop works with several filesystems, it also defines its own, named Hadoop Distributed File System (HDFS), specifically designed for high throughput and fault-tolerance. Hadoop 2.x introduced Transparent Data Encryption (TDE), enabling symmetric encryption at rest for HDFS, a very important measure for data security and compliance with PCI DSS, HIPAA, FISMA and other regulations. TDE works at the file level, encrypting each file using a random Data Encryption Key (DEK). The DEK is, in turn, encrypted with a "master" Encryption Zone key (EZkey), creating an Encrypted Data Encryption Key (EDEK). This way, the EZKey is required each time an operation over an encrypted file is performed. Management of EZKeys and their operations is centralized by a special component called the Key Management Server (KMS). The data owner can define in the KMS different "encryption zones", which essentially act as directories whose content is encrypted, each of them with a different EZKey. The KMS interoperates with key store servers in order to retrieve EZKeys when needed.

However, standard Hadoop TDE often presents challenges:

1. TDE generally supports only symmetric encryption. This means that in case of external organizations acting as data sources (e.g., contractors, partners, etc.), they have to ask the KMS to encrypt data encryption keys (DEKs). This implies that the KMS has to be online all the time (even for data collection purposes).

2. In many cases, there is only support for AES in unauthenticated CTR mode. This means that data can potentially be corrupted or deliberately changed while encrypted.

3. During regular read/write requests, all the nodes which access that data frequently (e.g., at each map or reduce operation) communicate to the centralized KMS to obtain access to data upon which operations are performed locally. In addition to being always online, the KMS often has to be very close to the Hadoop cluster and be able to handle large numbers of requests per second. These requirements are expensive in scenarios where a Hadoop cluster is deployed in a remote cloud with keys on premise.

4. Key rotation is hard to perform because of the risk of exposing old and new secret keys to the machines in the cluster. Key rotation is generally not supported in Hadoop TDE, and manual workarounds are slow or insecure. Nevertheless, periodic key rotation is required for security and compliance with regulations in many use cases.

Certain existing public-key encryption schemes allow an entity holding a private key related to some public key to decrypt ciphertexts encrypted under said public key. The encryption scheme proposed by ElGamal is one example of public-key encryption scheme (see ElGamal, T. (1984, August). A public key cryptosystem and a signature scheme based on discrete logarithms. In Workshop on the Theory and Application of Cryptographic Techniques (pp. 10-18). Springer Berlin Heidelberg.) Public-key encryption is one of the basic tools of public-key infrastructures. In recent years, research on more advanced functionalities has been conducted in relation with public-key encryption, leading to schemes where decryption of ciphertexts originally encrypted by some public key can be performed with a private key not associated with said public key. This is what is known as "Proxy re-encryption" by the scientific community. There are several proxy re-encryption schemes in the literature, being the most prominent those based on ElGamal public-key encryption scheme, such as the ones proposed by Blaze et al. (see Blaze, M., Bleumer, G., & Strauss, M. (1998, May). Divertible protocols and atomic proxy cryptography. In International Conference on the Theory and Applications of Cryptographic Techniques (pp. 127-144). Springer Berlin Heidelberg) and Ateniese et al. (see Ateniese, G., Fu, K., Green, M., & Hohenberger, S. (2006). Improved proxy re-encryption schemes with applications to secure distributed storage. ACM Transactions on Information and System Security (TISSEC), 9(1), 1-30.)). Each paper referenced in this paragraph is hereby incorporated by reference.

Some embodiments provide nodes in a Hadoop cluster configured to operate on encrypted data (e.g., execute a mapping function or reducing function specified by a user to the Hadoop framework and that takes as input the encrypted data (in decrypted form) and outputs transformed versions of the encrypted data (in decrypted form) so that it can be encrypted in a newly encrypted set of data) in an untrusted portion of the distributed application while minimizing (or otherwise reducing) communication with the KMS in the trusted portion. Some embodiments integrate a proxy re-encryption scheme (which is a type of public key cryptosystem) within the TDE functionality. This way, in some embodiments, the EZKeys (which in Hadoop TDE are symmetric keys) are substituted by a pair of public and secret keys, namely the Public Encryption Zone Key (PEZ-Key) and the Secret Encryption Zone Key (SEZKey). The conjunction of these two keys is called an EZKeypair herein. As in any public-key encryption cryptosystem, the public key (which corresponds to the PEZKey in some embodiments) is used for encryption, while the secret key (which corresponds to the SEZKey some embodiments) can be used for decryption. Therefore, in some embodiments, when encrypting data files for storage in the filesystem, the PEZ-Key is used to create EDEKs from DEKs, while the SEZKey can be used to decipher DEKs from EDEKs (that is, the opposite operation). These actions correspond with write and read access flows, respectively. Since PEZKeys are public they do not need any special protection (apart from guaranteeing its integrity and authenticity in some use cases, for instance with a cryptographic hash signature). On the other hand, SEZKeys, in some embodiments, are kept secret (e.g., in a trusted portion of the distributed application), in a similar way than TDE handles regular, symmetric EZKeys.

Using proxy re-encryption, some embodiments improve the read access flow so that SEZKeys are not used directly by a consumer (such as a computing node in the untrusted portion of the application executing the mapping or reducing functions). In some embodiments, the owner of the encryption zone, which controls the SEZKey, generates a special key called Transformation Key (TK), which in some embodiments, allows embodiments to transform EDEKs under PEZKey to EDEKs under a different public key, such as the public key of a consumer, which can decrypt them using the corresponding secret key (this process is known as "Re-Encryption" in proxy re-encryption literature). Embodiments are described with reference to a pair of public and secret keys of a consumer as PCKey and SCKey, respectively. The conjunction of these two keys is called a CKeypair herein. Each consumer in the system, in some embodiments, has a different CKeypair, that is, a different pair of PCKeys and SCKeys. In sone cases, each of a plurality of tenants, applications, sessions, or users may have a different CKeypair. For a given PEZKey and SEZKey pair, the owner of the encryption zone generates a TK for each consumer in the system (in some cases, there is a consumer for each computing node, or all the nodes act may as a single consumer). Therefore, in some embodiments, the transformation process uses the re-encryption functionality offered by proxy re-encryption to transform an EDEK, initially encrypted under a PEZKey as part of a write access request, into a new EDEK, called Transformed EDEK (TEDEK), which can be decrypted by the consumer with its SCKey in some embodiments.

The architecture of some embodiments introduces two entities over conventional TDE (which is not to imply that all embodiments must include one or both of these entities or that other descriptions are limiting). One of them is the Transformation Node (TN), which is in charge of transforming data between the original PEZKey and the consumer PCKey using the corresponding TK. The other entity is called LocalKMS, since it is local to the consumer nodes, and it handles the decryption of data for each node.

In some embodiments, once the original EDEK is transformed into a TEDEK, a consumer that wants to read the data as part of a read access request does not need to communicate with the KMS at any moment. In some embodiments, the KMS communicates with the cluster only when it grants the permissions to execute a job. Before execution, in some embodiments, the KMS generates temporary key pairs for the consumer nodes (that is, pairs of a PCKey and a SCKey), which are securely transferred to the nodes (e.g., with SSH). Next, in some embodiments, a transformation key TK is generated to grant permission to decrypt data with the SCKey and subsequently deployed to the cluster, specifically, to the local Transformation Node.

When a node requests an encrypted file from the filesystem, in some embodiments, the Transformation Node transparently transforms the data from the original PEZkey to the temporary PCKey. Hence, from the point of view of the consumer nodes, files appear as if they were originally encrypted under their temporary PCKey.

Figure 7:
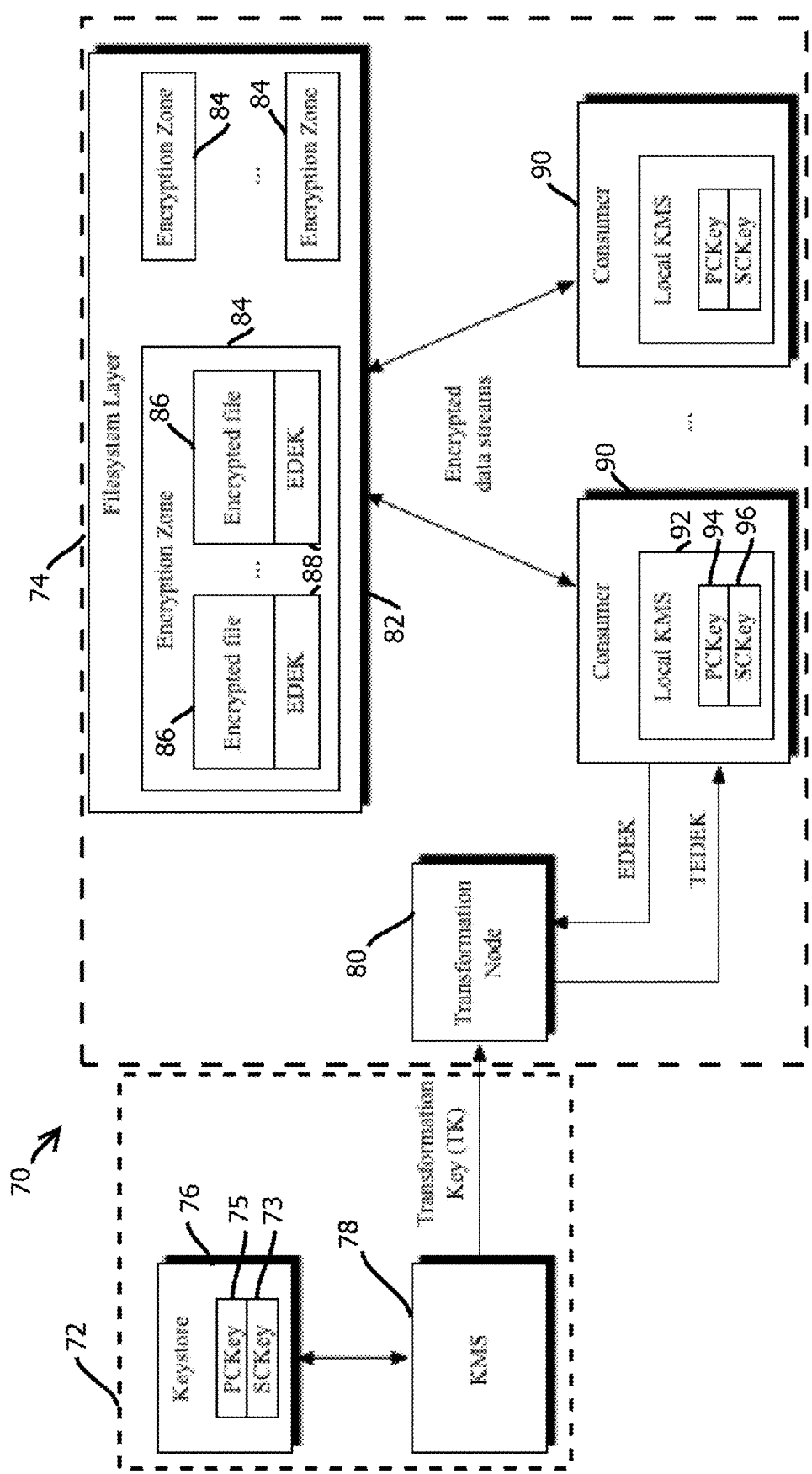
FIG. 7 illustrates the logical architecture of some embodiments.

FIG. 7 shows a high-level view of the architecture of some embodiments. FIG. 7 and the above are examples of distributed applications, which are applications executing on a plurality of computing devices, such as on a plurality of computing nodes, like containers, virtual machines, unikernels, non-virtualized operating systems, and the like. In some embodiments, the distributed application described herein may be a subset of a larger distributed application, such as a backend to a web application or application program interface accessed by remote user computing devices or other distributed applications, arrangements which may be characterized under the rubric of being distributed applications themselves in the aggregate.

In some embodiments, the illustrated distributed application 70 may include a trusted portion 72 and an un-trusted portion 74. The term "trust" herein does not require a state of mind, but rather serves to distinguish different portions of the distributed application in which different security techniques are applied, with the "un-trusted" portion being assumed to be more vulnerable to attack potentially than the "trusted portion," or architected as if this is the case. In some embodiments, the trusted portion 72 may execute in different processes, on different computing devices, on different subnets, or otherwise separate from the un-trusted portion 74, and in some cases with communication therebetween only through relatively well-defined and manageable channels that tend to diminish the attack surface of the trusted portion 72 relative to the untrusted portion. For instance, the untrusted portion may execute user-supplied code, while the untrusted portion may not in some implementations.

In this example, the trusted portion 72 includes a keystore 76 having one or more public-private cryptographic key pairs, such as the key pair with a private cryptographic key 73 and a public cryptographic key 74, in some cases generated with the techniques described herein for public key cryptography. In some embodiments, the key store 76 may store a plurality of different cryptographic key pairs, in some cases each (or subsets thereof) corresponding to different tenants, use cases, encryption zones, users, applications, sessions, and the like. In some embodiments, the private cryptographic key 73, also referred to as a secret cryptographic key, of the illustrated key pair may remain within the trusted portion 72 of the distributed application 70 when data is protected with that key through encryption and while techniques described herein are used to delegate access to computing devices in the un-trusted portion 74 without the secret cryptographic key 73 leaving the trusted portion 72 or the computing devices in the un-trusted portion 74 otherwise having access to the secret cryptographic key 73 (at least before the key pair is rotated out).

In some embodiments, the trusted portion 72 may include a key management system 78. In some embodiments, the key management system 78 may operate as described below to emit transformation keys from the trusted portion 72 into the un-trusted portion 74 to facilitate proxy re-encryption of encrypted values without exposing the secret cryptographic key 73 to the untrusted portion and without transmitting the encrypted values from the un-trusted portion 74 into the trusted portion 72 (which in some cases may be remote and expensive in terms of bandwidth or latency to communicate with when exchanging data at that scale). In some embodiments, values, such as files or encryption keys, like symmetric encryption keys by which those files are encrypted, may themselves be encrypted with the public cryptographic key 75 in the keystore 76, for instance, by sending the public cryptographic key 75 from the trusted portion 72 into the un-trusted portion 74, such that the files may be encrypted, or encryption keys thereof may be encrypted, without transmitting the files to be encrypted into the trusted portion 72 from the un-trusted portion 74. Or in some cases, any of these values may be shuffled back and forth with the transformation in the trusted portion 72, which is not to suggest that any other description herein is limiting.

In some embodiments, a transformation node 80 may receive the transformation key and execute one or more of the above-described proxy re-encryption algorithms based on the transformation key to transform an encrypted data encryption key into a transformed encrypted data encryption key that is accessible with a different cryptographic key pair from that in the keystore 76. In some embodiments, the transformation node 80 may be in the trusted portion 72, or in some embodiments, the transformation node 80 may be in the un-trusted portion 74, as illustrated, e.g., to reduce latency and bandwidth by positioning the transformation node locally or on the same subnet. Some embodiments may include a plurality of transformation nodes 80 to facilitate concurrent operations. In some embodiments, each illustrated consumer computing node 90 may include its own instance of the transformation node 80 locally, several may share a transformation node, or transformation nodes may correspond to different sets of encryption zones and consumers may change which transformation node is accessed based on the encryption zone of data for which they seek access.

In some embodiments, a workload of the distributed application 70 may be executed by consumer computing nodes 90, such as worker nodes in the Hadoop framework. In some embodiments, these consumer nodes may execute a mapping function specified by a user of the distributed application 70 on stored records that are protected with the presently described cryptographic techniques, or the consumer nodes 90 may execute a reducing function specified by the user on these records. Or in some cases, other operations, like complex event processing rules or queries may be applied to such records by the consumer nodes 90. As mentioned above, there may be a relatively large number of consumer nodes 90 concurrently processing data, such as more than 10, more than 100 or more than 1000,or more than 2, more than 10, or more than 100 computing devices, e.g., in a datacenter remote from the trusted portion 72.

In some embodiments, each consumer node 90 may include a local key management system 92 operative to obtain encrypted data encryption key for a file to which the consumer node 90 seeks access, send the encrypted data encryption key to the transformation node 80 with a request to transform the data encryption key, in some cases with an identifier of a cryptographic key pair including a public cryptographic key 94 and a secret, or private, cryptographic key 96 of the respective consumer node 90. In some embodiments, both the public cryptographic key 94 and the secret cryptographic key 96 may be sent to the transformation node 80 for this operation, or some embodiments may just send the public cryptographic key 94 and not the secret cryptographic key 96.

In some embodiments, the local key management system 92 is operative to receive back a transformed encrypted data encryption key, which the consumer node 90 may decrypt with the secret cryptographic key 96. In some embodiments, the consumer node 90 may then access a symmetric cryptographic key of the encrypted file (also referred to as a record, though the term "record" is broader and encompasses a more diverse set of data structures than just files, like entries in a database, key-value pairs, portions of documents, binary-large-objects (BLOBs), and the like) to be accessed from the result of decrypting the transformed encrypted data encryption key. In some embodiments, the consumer node 90 may then decrypt the corresponding file of the transformed encrypted data encryption key with the accessed symmetric key to access the underlying information, i.e., accessing the message of the ciphertext, which is in decrypted form when accessed.

In some embodiments, the result of decrypting the record may be input into a mapping function, input into a reducing function, compared to a query to determine if it is responsive, or applied to a set of rules in an event processing system. In some embodiments, the result may then be output (in some cases, applying TLS encryption during transit on the network) or re-encrypted, for instance, with the same or a different symmetric encryption key. Symetric encryption keys may be, for instance, a random (e.g., pseudorandom) sequence of bits longer than 256 bits, 512 bits, 1028 bits, or longer. The symmetric encryption key, may then be encrypted with the public cryptographic key 75 that is associated with the secret cryptographic key 73 in the key store 76 of the trusted portion 72 of the distributed application 70.

In the illustrated embodiment, there is one local key management system per consumer node 90, but other embodiments may have other arrangements, such as architectures in which one local key management system serves multiple consumer nodes from within the un-trusted portion 74 of the distributed application 70.

In some embodiments, accessed files or other records may be stored in the file system layer 82 in the un-trusted portion 74, for instance, in an instance of the Hadoop file system (HDFS) described above. In some embodiments, files may be segmented into blocks each having some discrete size, other than a last block that stores a residual portion, and those blocks may be stored on different computing nodes of the distributed application, in some cases redundantly (e.g., in triplicate), with the same block stored on different nodes, and in some cases, stored records may be encoded with Hamming codes or Turbo codes to facilitate recovery even if every replicated instance of a given block is lost due to concurrent failure of multiple computing nodes. In some embodiments, the encrypted data encryption key (which may be a ciphertext that encrypts a symmetric encryption key with which the corresponding record was encrypted) may be encrypted with the public cryptographic key 75, and the result may be stored in association with the corresponding encrypted file 86, as indicated by block 88 in FIG. 7. Association in this example may be obtained, e.g., by storing the encrypted data encryption key as metadata of the file holding the ciphertext, with a lookup table, by pointers in metadata, or as entries in hashtables with an index based on a hash of information in the ciphertext. In some embodiments, each encrypted file may have a different data encryption key and, therefore, a different encrypted data encryption key, as illustrated. A file or other record may include both an encrypted portion, such as content of the file (or encrypted entries in the content), and an unencrypted portion, such as a file name and other metadata, while still being said to be encrypted.

In some embodiments, encrypted files may be logically arranged in encryption zones 84, in some cases each of which may correspond to a different cryptographic key pair in the keystore 76, such that access to a given secret cryptographic key in the keystore 76 affords access to each of the records in a corresponding one of the encryption zones 84. In some embodiments, encryption zones may be further nested, for instance, by encrypting a collection of secret cryptographic keys corresponding to the collection of encryption zones and controlling access to that higher layer of encryption's secret cryptographic key. In some embodiments, three, four, five, six, or more layers of encryption may be applied to generate higher levels of hierarchical arrangement of access.

Proxy Re-encryption

Some embodiments implement a proxy re-encryption scheme. A variety of different forms of proxy re-encryption may be used, including those described in U.S. Patent Application 62/427,401, filed 29 Nov. 2016, titled METHOD AND SYSTEM FOR SWITCHING PUBLIC KEYS IN CIPHERTEXTS, the contents of which are hereby incorporated by reference. In some cases, the proxy re-encryption scheme prevents a delegate from accessing the content of a message or from accessing a private key corresponding to the public key with which the message was encrypted. In some embodiments, the proxy re-encryption schemes provide at least the following functionalities, embodied by these algorithms:

PRE.Setup(secParam)→publicParams. On input the security parameter secParam, the setup algorithm PRE. Setup outputs an object that contains the public parameters of the scheme. In some cases, these parameters are publicly known.

PRE.KeyGen( )→(pk#i, sk#i). The key generation algorithm PRE.KeyGen outputs a pair of public and secret keys (pk#i, sk#i) for entity i. The term "secret key" is also referred as "private key" in this description.

PRE.Enc(pk#i, m)→ci . On input the public key pk#i and a message m, the encryption algorithm PRE.Enc outputs a ciphertext c#i.

PRE.Dec(sk#i, c#i)→m. On input the secret key sk#i and a ciphertext c#i, the decryption algorithm PRE.Dec outputs a message m.

PRE.ReKeyGen(pk#i, sk#i, pk#j , sk#j)→rk[i→j]. On input the pair of public and secret keys (pk#i, sk#i) for entity i and the pair of public and secret keys (pk#j,sk#j) for entity j, the re-encryption key generation algorithm PRE.ReKeyGen outputs a re-encryption key rk[i→i].

PRE.ReEnc(rk[i→j], c#i)→c#j. On input a re-encryption key rk[→j] and a ciphertext c#i, the re-encryption algorithm PRE.ReEnc outputs a second ciphertext c#j, which can be decrypted by entity j using sk#j.

In order to support key rotation, in some embodiments, the PRE scheme is multi-use, which means that re-encrypted ciphertexts can be re-encrypted again, which implies that the re-encryption process can be performed an arbitrary number of times. Another characteristic of the PRE scheme that can influence how the scheme is used is if it is interactive or non-interactive. The former means that the re-encryption key generation (i.e., the PRE.ReKeyGen function) uses the secret key sk#j, while the latter means that it does not use it. The implication of this is that interactive schemes, in some embodiments, require the participation of entity j in the re-encryption key generation process since it involves secret key sk#j, while non-interactives do not, since only pk#j is needed.

Additionally, in some embodiments, the PRE scheme has access to a secure source of randomness in the form of a cryptographically secure pseudorandom number generator (CSPRNG).

Generation of Cryptographic Keys

Generation of EZKeypairs

In some embodiments, the KMS is in most cases in charge of generating EZKeypairs each time an authorized user creates an encryption zone or updates the version of an existing encryption zone (which entails using a new set of keys). It should be noted that it is not mandatory that the process of generating EZKeypairs is performed inside the system, which is not to imply that other described operations are mandatory. That is, the EZKeypair can be generated by the data owner externally and provided to the system. However, it is advisable that the KMS handles generation of EZKeypairs, and that the secret component (i.e., the SEZKey) is managed securely (for example, stored by a keystore server). In c, from the cryptographic point of view, EZKeypairs are generated using the PRE.KeyGen function as follows:

(PEZKey#i, SEZKey#i)=PRE.KeyGen( )

That is, PEZKey#i and SEZKey#i are a proxy re-encryption public and private key, respectively.

Generation of CKeypairs

In some embodiments, CKeypairs are intended to be short-lived, and are regenerated frequently, depending on an admin-suplied frequency (e.g., daily). Depending on the characteristics of the PRE scheme, the CKeypairs may be generated in different ways. In particular, this may depend on the scheme being interactive or not. If the scheme is not interactive, in some cases, then CKeypairs can be generated locally by the consumer nodes (specifically, in the LocalKMS), and it is only necessary to send the PCKey to the KMS after that, in some embodiments. If the scheme is interactive, in some cases, then CKeypairs are generated in the KMS, so the KMS can retain a copy of the SCKey before sending it to the consumer nodes. SCKeys are needed for generation of Transformation Keys when interactive PRE schemes are used in some embodiments. Since SCKeys are secret, special care must be taken to protect them properly and must be securely erased once they are not needed. In some cases, from the cryptographic point of view, CKeypairs are generated using the PRE.KeyGen function as follows:

(PCKey#j, SCKey#j)=PRE.KeyGen( )

Generation of Transformation Keys (TKs)

Each time a new pair of CKeypairs is generated, some embodiments create or update the corresponding TK between the current EZKeypair and the new CKeypair. The KMS in some embodiments is in charge of generating TKs, since it involves using an encryption zone's secret key (SEZKey). TKs are generated as re-encryption keys, using the PRE.ReKeyGen algorithm between an EZKeypair and a CKeypair. Note that when the PRE scheme is non-interactive, the whole CKeypair is not needed, only the PCKey; in this case, TKs are generated using the PRE.ReKeyGen function as follows:
TK[i→j]=PRE.ReKeyGen(PEZKey#i, SEZKey#i, PCKey#j)

On the other hand, when the scheme is interactive, SCKeys are needed in some embodiments; in this case, TKs are generated using the PRE.ReKeyGen function as follows:
TK[i→j]=PRE.ReKeyGen(PEZKey#i, SEZKey#i, PCKey#j, SCKey#j)

Generation of Key Rotation Keys (KRKs)

Upon request by the owner of an encryption zone, some embodiments rotate the EZKeypair, which in some cases entails modifying the encrypted files so they correspond to a new EZKeypair. To this end, the KMS issues a Key Rotation Key (KRK), which is basically a re-encryption key between two different EZKeypairs, and sends it to the cluster to perform the rotation operation. From the cryptographic point of view, in some embodiments, KRKs are generated as re-encryption keys, using the PRE.ReKeyGen algorithm, but between two EZKeypairs, instead of an EZKeypair and an CKeypair, as Transformation Keys (TKs). When the scheme is non-interactive, KRKs are generated as follows:
KRK[i→i']=PRE.ReKeyGen(PEZKey#i, SEZKey#i, PEZKey#i')

On the other hand, when the scheme is interactive, KRKs are generated as follows:
KRK[i→i']=PRE.ReKeyGen(PEZKey#i, SEZKey#i, PEZKey#i', SEZKey#i')

Writing Data to the Filesystem

Figure 8:
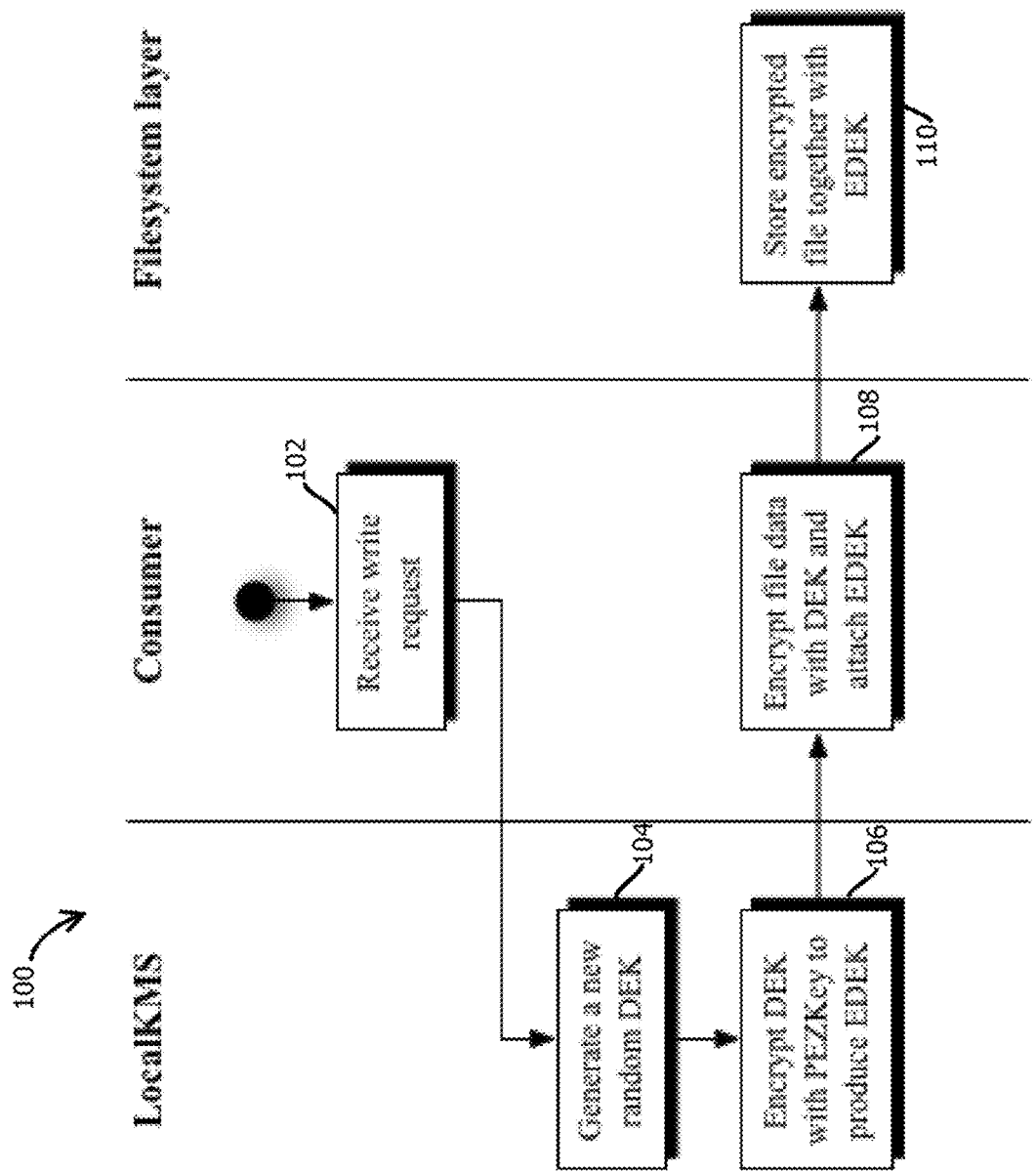
FIG. 8 illustrates an example of a process to write data to the file system of some embodiments.

When a consumer writes data to the filesystem, in some embodiments, as shown in FIG. 8, the LocalKMS generates a random DEK, which the consumer uses as an encryption key to encrypt file's data with a symmetric encryption algorithm (typically AES, with 128/256 bits and CBC/GCM mode of operation). The LocalKMS encrypts the DEK using the PEZKey to produce an EDEK, as follows:
EDEK=PRE.Enc(PEZKey, DEK)

The resulting EDEK, in some embodiments, is associated to the encrypted file within the filesystem. There is no need for communication with the KMS during this process, as shown in FIG. 8.

FIG. 8 shows an example of a process 100 that may be executed by the distributed application 70 or other implementations to form the encrypted records upon which embodiments operate. In some embodiments, this process, the other processes described herein, and the other functionality described herein, may be implemented with tangible, non-transitory, machine-readable media storing instructions that when executed by one or more processors effectuate the operations described herein. It should be emphasized that, notwithstanding use of the singular term "medium," in some cases the instructions may be distributed in memory (a term which is used broadly to include storage or dynamic random-access memory) of different computing devices that execute different subsets of the instructions, an arrangement consistent with use of the singular term "medium." Similarly, the operations of this and the other processes described herein may be executed in a different order from that depicted, instructions may be inserted, instructions may be omitted, subsets of the instructions may be executed concurrently or serially, or different operations may be performed by different entities than those listed in the illustrated columns, none of which is to suggest that any other description herein is limiting.

In some embodiments, the process 100 includes a consumer computing device receiving a write request, as indicated by block 102. In some embodiments, this may be a request to write the result of a mapping function or a reducing function or request to write data being ingested by the distributed application 70, such as workload data of the application being written to the filesystem layer.

Some embodiments may then generate a new random data encryption key, as indicated by block 104, for example, by invoking a random number generator of the host computing device, which in some cases may seed a random value with, for example, electromagnetic noise, thermal fluctuations, reading from a Geiger counter, or the like.

Some embodiments may then encrypt the data encryption key with a public encryption key of a cryptographic key pair stored in the trusted portion of the distributed application to produce an encrypted data encryption key, as indicated by block 106.

Some embodiments may then encrypt the file data for which the request is received, in some cases included with the request, with the data encryption key, for instance, by repeatedly XOR'ing the message with the data encryption key or otherwise transforming the data in deterministic manner with the data encryption key. Some embodiments may further attach or otherwise associate the encrypted data encryption key with the encrypted file, as indicated by block 108. Some embodiments may then purge the data encryption key from memory and store the encrypted file in association with the encrypted data encryption key, as indicated by block 110, for instance, in the above-described filesystem layer 82.

Reading Data from the Filesystem

Figure 9:
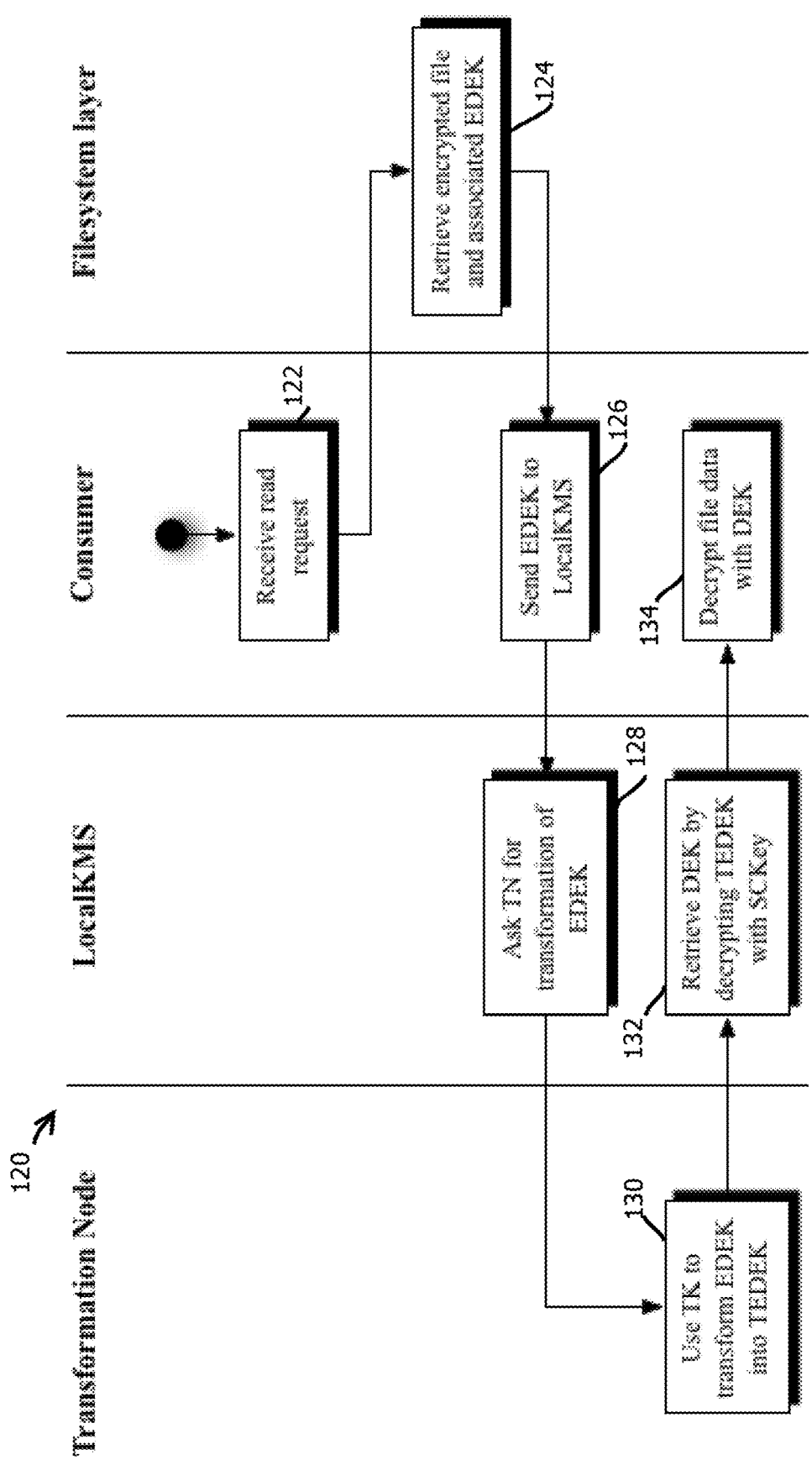
FIG. 9 illustrates an example of a process to read data from the file system of some embodiments.

When a consumer node reads an encrypted file, in some embodiments, as shown in FIG. 9, it fetches from the filesystem the EDEK that corresponds to the file, sends this EDEK to its LocalKMS, which in turn asks the TN to transform the EDEK into a TEDEK. The TN, in some embodiments, performs the following operation, assuming it is already in possession of the corresponding TK between the PEZKey and the consumer's PCKey:
TEDEK=PRE.ReEnc(TK, EDEK)

The LocalKMS, in some embodiments, now can decrypt the TEDEK using his temporary private key (SCKey), obtaining a DEK, as follows:
DEK=PRE.Dec(SCKey, TEDEK)

After that, in some embodiments, the LocalKMS gives the DEK back to the consumer that requested it. The consumer then uses the DEK to decrypt the file, which was encrypted using symmetric encryption techniques.

FIG. 9 shows an example of a process 120 by which data is read in accordance with some embodiments of the present techniques. Some embodiments include a consumer computing node receiving a read request, as indicated by block 122, which may include generating a read request or determining to read data within the computing node. Some embodiments may then retrieve the encrypted file and associated encrypted data encryption key from the filesystem layer, as indicated by block 124. In some embodiments, each encrypted file may be associated with a unique identifier, and that unique identifier may be specified in the read request. Embodiments may parse the unique identifier from the read request and access the corresponding record in the file system later based on the identifier.

Some embodiments retrieve the encrypted data encryption key from the retrieved encrypted file and key pair and send the encrypted data encryption key to a local key management system, as indicated by block 126. In some embodiments the local key management system may then advance the encrypted data encryption key to the transformation node with a request to transform the encrypted data encryption key, as indicated by block 128. In some embodiments, the transformation node may then use a previously received transformation key to transform the encrypted data encryption key into a transformed encrypted data encryption key, as indicated by block 130, for instance with proxy re-encryption. In some cases, access to a given record may be delegated to multiple entities, and the request may include an entity identifier (e.g., a corresponding public cryptographic key) by which the transformation node selects among a plurality of different transformation keys to identify the one corresponding to the secret cryptographic key held by the requestor in the local key management system In some embodiments, transformation keys may be generated at the beginning of a computing job and sent to the transformation node or responsive to some other event in which it is determined that an entity is to be delegated access to records in a specified encryption zone.

Some embodiments may then retrieve the data encryption key by decrypting the transformed encrypted data encryption key with a secret cryptographic key of the local key management system, as indicated by block 132. This key, in some cases, may stay resident on the local system. As noted above, the secret cryptographic key may be a secret key of a cryptographic key pair of the entity to which access is delegated, operating in the un-trusted portion of the distributed application, and different from the cryptographic key pair with which the data encryption key is encrypted to produce the encrypted data encryption key.

Some embodiments may then decrypt the file with the data encryption key, indicated in block 134, accessed in the previous operation. Some embodiments may then return the file responsive to a query or operate on the file to execute user-specified instructions, for instance ,by calling a registered callback function from a framework of the distributed application, like a user-specified mapping function or a user-specified reducing function.

Key Rotation

Figure 10:
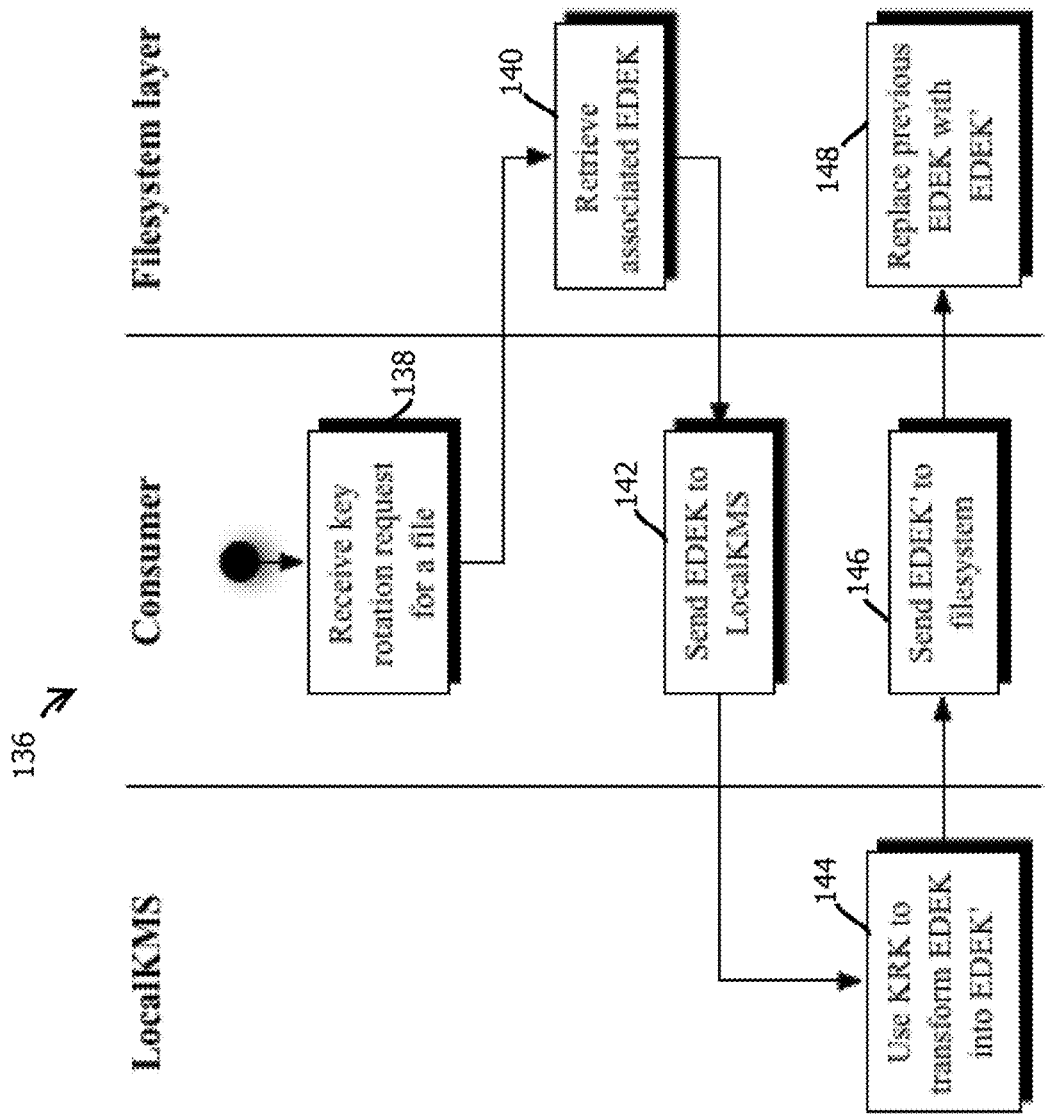
FIG. 10 illustrates an example of a process to rotate keys in some embodiments.

An example of key rotation is shown in FIG. 10. It should be noted that key rotation in some embodiments can be performed directly at the filesystem layer (e.g., using DataNodes). Or key rotation may be performed with a method more compliant with TDE, using computing nodes, as described below.

After a new version of PEZkey is introduced, in some embodiments, the KMS creates a Key Rotation Key (KRK) which allows to transform data from being encrypted under an old version of PEZkey, to a new version of the PEZkey. KRKs are similar to transformation keys, although they do not enable delegation of access to consumer nodes.

Next, in some embodiments, the KRK is given to the cluster, which is fully employed for doing key rotation. In order to do so, in some embodiments, each computing node receives a copy of the KRK (which is temporally stored in the LocalKMS), and is used as a consumer, with the assignment of rotation a set of encrypted files. For each file, in some embodiments, the procedure is the same: the consumer retrieves the EDEK associated to the file and sends it to its LocalKMS, which transforms it to EDEK' using the KRK (more specifically, the consumer performs a re-encryption operation over the EDEK ciphertext using the KRK as re-encryption key). The performed operation may be as follows:

EDEK'=PRE.ReEnc(KRK, EDEK)

The new EDEK' is sent back to the filesystem, where it replaces the previous version.

It is expected that a typical 1000-node cluster can perform key rotation at a speed of 2 petabytes per second. During this process, in some embodiments, no decryption keys are exposed and the data is never decrypted.

FIG. 10 shows an example of a process 136 by which keys may be rotated in accordance with some embodiments. Some embodiments may receive a key rotation request for a file, in some cases specifying the file's unique identifier, as indicated by block 138. Some embodiments may then retrieve the associated encrypted data encryption key of that file, as indicated by block 140, and send the encrypted data encryption key to the local key management system, as indicated by block 142. Some embodiments may then access a key rotation key and use the key rotation key to transform the encrypted data encryption key into a new encrypted data encryption key, as indicated by block 144.

Some embodiments may then send the new encrypted data encryption key to the filesystem layer for storage, as indicated by block 146, and replace the encrypted data encryption key that was previously stored in association with the file ciphertext with the new encrypted data encryption key, as indicated by block 148. (It should be noted that "sending" and related operations herein can be achieved by cutting and transmitting, copying and transmitting, or transmitting an address or other pointer to the item by which the item may be retrieved.)

After the transformation, the former data encryption key will no longer work to decrypt the file ciphertext, so a malicious entity in the un-trusted portion who was previously delegated access and surreptitiously retained in memory a data encryption key will no longer have access after key rotation, as that old data encryption key will not work to access the file after the rotation operation of block 144. Further, as noted above, in some cases, key rotation may be achieved at the local key management system, or transformation node, without transferring the ciphertext of the keys (or underlying files) from the un-trusted portion back to the trusted portion and then back into the trusted portion of the distributed application, thereby affording faster key rotation, reduced bandwidth, and a smaller attack surface for more sensitive parts of the system. It should be emphasized, though, that not all embodiments provide all described benefits, as various engineering and cost trade-offs are envisioned, none of which is to suggest that any other description herein is limiting.

In order to improve performance and security, in some embodiments, it is possible to scale the transformation infrastructure horizontally. This is achieved by transparently partitioning a single encrypted zone into multiple subzones, in such a way that the transformation architecture is replicated for each subzone. The cryptographic material, in some embodiments, for each subzone is generated by a key derivation procedure, which potentially can account for contextual information of the data to drive the partitioning, such as data category, location, etc.

A secondary advantage of this method, in some embodiments, is that it provides automatic interoperability with existing key store servers that support the current format for EZKeys (normally, a symmetric encryption key, such as a AES-128 key), since PEZKeys and SEZKeys for the subzones can be derived from a single EZKey.

Figure 11:
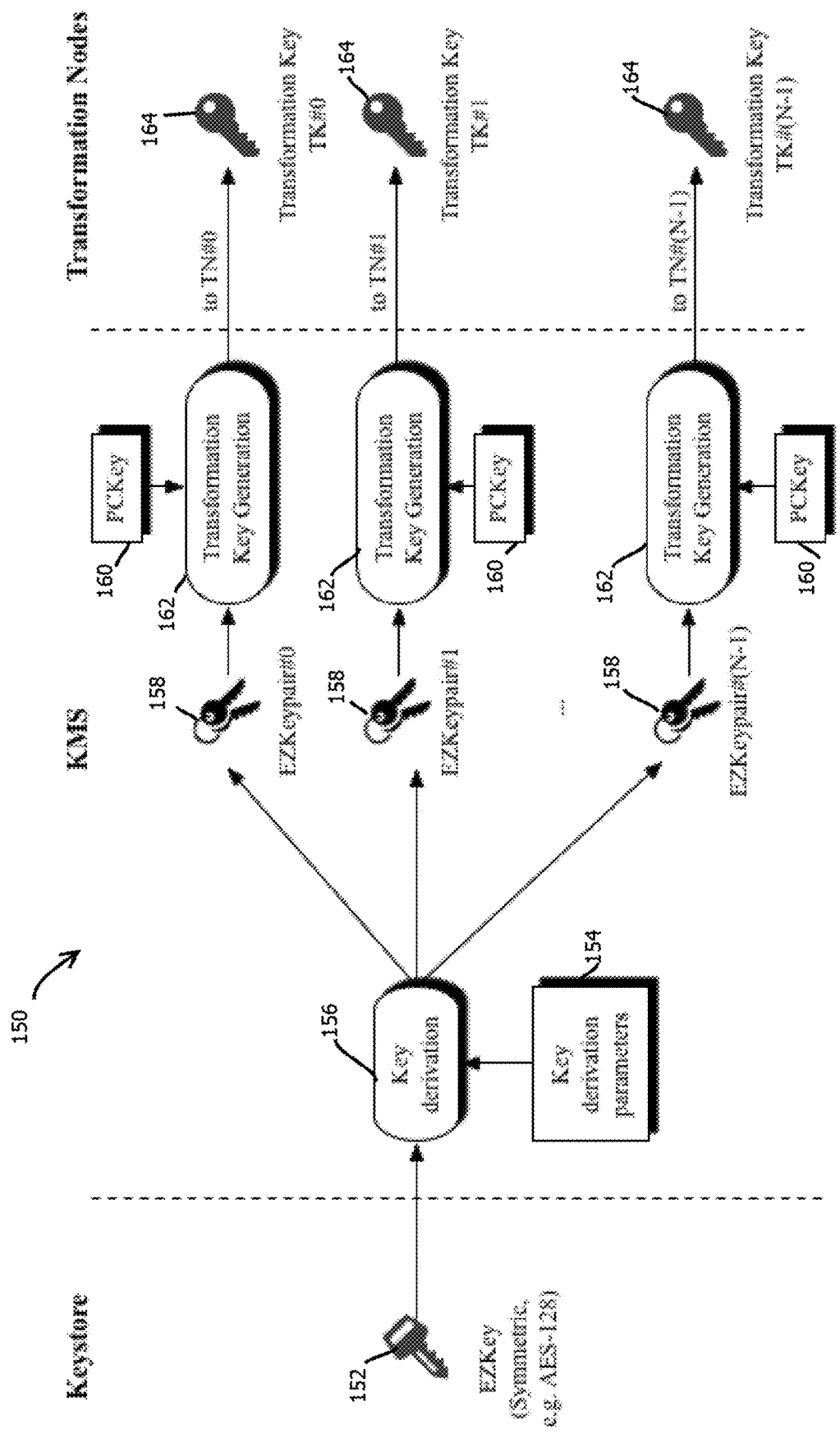
FIG. 11 illustrates an example of an architecture supporting encrypted subzones in some embodiments.

FIG. 11 represents how subzone EZKeypairs, in some embodiments, are created from a single EZKey (which can be a traditional TDE key, e.g., AES-128). The figure is arranged horizontally to represent how the stages of key generation, in some embodiments, starting from a single symmetric EZKey (as in regular TDE) that is used by the KMS as source secret material to derive EZKeypairs, one for each encryption subzone. The final choice of key derivation depends on different factors, as well as on the nature of the proxy re-encryption scheme in use; in some embodiments, this process receives a common set of key derivation parameters and is deterministic. Next, in some embodiments, the KMS can use each of the suzones' EZKeypairs as input to the Transformation Key Generation process, together with key material about the consumer (which can be only the PCKey if the PRE scheme is non-interactive, or a CKeypair if the PRE scheme is interactive) in order to produce a TK for each subzone. Each TK is handled to the subzone's corresponding Transformation Node (TN).

With the process described before, in some embodiments, subzones are transparent to Hadoop TDE, which can still operate as if there is only an encryption zone, although internally, the system can manage N subzones. Note that if the system is configured for only one subzone (i.e., N=1), then there are not parallel transformation infrastructures, although transparency with respect Hadoop TDE is achieved. In other words, keystores and traditional TDE modules can manage symmetric EZKeys, while internally, the system operates with proxy re-encryption functions and keys, in some embodiments.

Inputs to the key derivation function, in some embodiments, are the following parameters: (i) the cryptographic material of the symmetric EZKey (or an equivalent secret); (ii) relevant metadata of this key (such as key name and version); (iii) the number of subzones (N), which is an integer between 1 and 65535; (iv) the subzone identifier (ID), which is an integer between 0 and N−1; and (v) an optional salt value. It should be observed that, for a fixed set of parameters and only modifying the subzone identifier ID, it is possible to derive N different EZKeyPairs, one for each subzone, as shown in FIG. 5.

EZKeypair#k=KeyDerivation(EZKey, keyMetadata, N, ID [, salt])

A variety of key derivation procedures may be used, and the procedure can depend on the PRE scheme in use. Some embodiments use a Key Derivation Function (KDF) over the aforementioned parameters to derive an auxiliary secret of enough size (e.g., 256 bits) and use this secret to seed a CSPRNG, which is used in the Key Generation algorithm of the PRE scheme (i.e., the PRE.KeyGen function). In some PRE schemes, public keys are computed with a deterministic function over the secret key, and admit to directly use the auxiliary secret as secret key, removing the need of the CSPRNG during key generation.

In order to transparently integrate the subzones functionality into the system architecture, some embodiments have a procedure to partition the file space with respect to the existing subzones. The system may include the definition of a partition function that map files to subzones according to some user-defined criteria. For consistency, this function may be deterministic. A simple partition function that can be used, which assumes that a hash value of the file (in integer representation) is known, consists of computing the integer value (PARTITION_SEED ^ int_hash) % N, where PARTITION_SEED is an arbitrary, but relatively big integer (e.g., ~30 bits or more), int_hash is the hash of the file in integer representation, N is the total number of subzones, and ^ and % represent the XOR and mod operators.

FIG. 11 shows an example of a process 150 by which a distributed application configured to use symmetric key cryptography is transparently retrofit to use public key encryption. This process further, in some implementations, may partition encryption zones of the distributed application, in some cases again in a manner that is transparent to the distributed application's legacy code base. Transparency here means that user code generally does not need to be rewritten to use the retrofit system and can be used both on a non-retrofit system and a retrofit system without substantial (or in some cases, any) modification. Further, transparency means that the distributed applications code generally continues to operate with the same logic outside of the retrofit before and after the retrofit without substantial (or in some cases, any) modification.

In some embodiments, the distributed application may be configured with a symmetric-key keystore that may supply a symmetric encryption key 152, such as a symmetric encryption key corresponding to an encryption zone, in some cases with a one-to-one correspondence in which each encryption zone is associated with a different symmetric cryptographic key and vice versa.

In some embodiments, key derivation parameters 154 and the symmetric encryption key may be supplied to a key derivation module 156, which in some cases may generate one or more public-private cryptographic key pairs based on the input key derivation parameters 154 and the symmetric cryptographic key 152. In some cases, the symmetric cryptographic key may not be discernible from a public cryptographic key of the generated cryptographic key pairs. In some embodiments, the symmetric cryptographic key, or value based thereon, may pass through a one-way function, such as a cryptographic hash function, and the key derivation may be based on the output of that one-way function. In some embodiments, 1, 2, 3, 10, 100, or more cryptographic key pairs may be generated based on a single symmetric cryptographic key.

In some embodiments, data encryption keys may be encrypted with one of the resulting public cryptographic keys of one of the cryptographic key pairs 158, for instance in accordance with one of the above-described write operations. In some embodiments, different files may have their data encryption keys encrypted with different resulting public cryptographic keys of different key pairs 158, thereby partitioning the data encryption zone into sub zones that are accessible with different public-private cryptographic key pairs. In some embodiments, some records may be stored with multiple encrypted data encryption keys corresponding to different ones of the key pairs 158. In some embodiments, sets of files protected by different ones of the cryptographic key pairs 158 may be disjoint or overlap and may be a subset of a different one of the sets.

Some embodiments may delegate access to the different partitions by inputting a corresponding one of the deterministically generated key pairs 158 and a public cryptographic key of a delegate 160 into a transformation node 162 that generates a corresponding transformation key, as indicated by block 164. In some embodiments, multiple transformation keys corresponding to different delegate cryptographic key pairs may be generated for a single cryptographic key pair 158, and in some cases, a single delegate public cryptographic key may be used to generate multiple transformation keys from multiple ones of the cryptographic key pairs 158, thereby delegating access to multiple partitions of the encryption zone.

Resulting transformation keys may be provided to corresponding transformation nodes, as illustrated. Consumer nodes may then access data in the manner described above with corresponding transformation keys via corresponding transformation nodes, in some cases specifying a delegate that seeks access, for instance, with that delegate's public cryptographic key, and specifying a partition of an encryption zone to which access is sought, so that the appropriate transformation node or transformation key may be selected from among a plurality of such keys to effectuate the access request.

Figure 12:
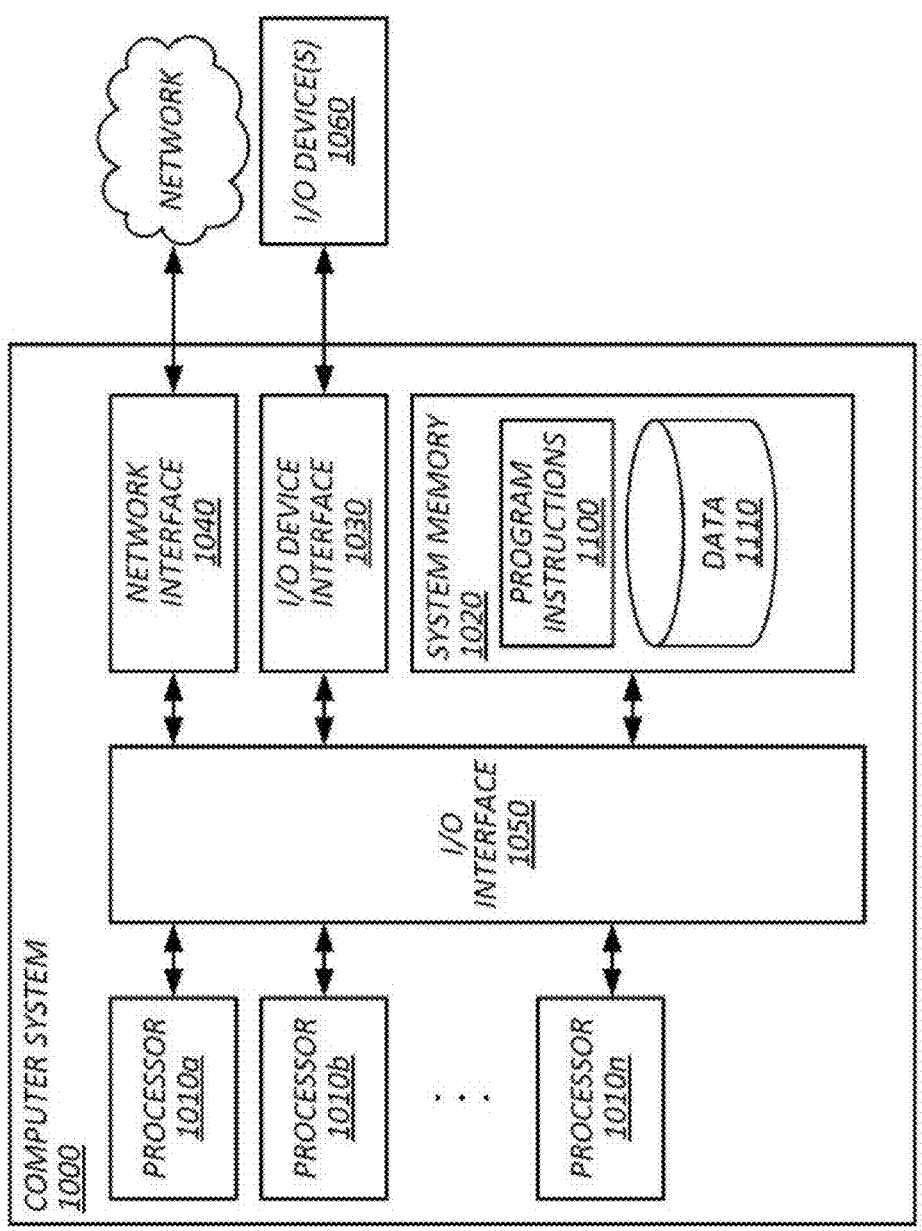
FIG. 12 shows an example of a computing device by which the above-described processes and systems may be implemented.

FIG. 12 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the"

include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpindicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, a plurality of records associated with an encryption zone in a distributed application executing on a plurality of computing nodes; encrypting, with one or more processors, each of the plurality of records with a respective data encryption key among a plurality of data encryption keys to form a plurality of encrypted records; encrypting, with one or more processors, each of the plurality of data encryption keys with a first public cryptographic key to form encrypted data encryption keys, wherein: the first public cryptographic key is a member of a first public-private cryptographic key pair including the first public cryptographic key and a corresponding first private cryptographic key, the first public cryptographic key corresponds to the encryption zone, the distributed application comprises a trusted portion and an untrusted portion, the first private cryptographic key is unavailable to the untrusted portion of the distributed application, and the first private cryptographic key is available to at least part of the trusted portion of the distributed application; obtaining, with one or more processors, a second public cryptographic key in the trusted portion of the distributed application, wherein: the second public cryptographic key is a member of a second public-private cryptographic key pair including the second public cryptographic key and a corresponding second private cryptographic key, and the second public-private cryptographic key pair is different from the first public-private cryptographic key pair; generating, with one or more processors, a transformation key based on the first public-private cryptographic key pair and the second public cryptographic key, wherein the transformation key is generated in the trusted portion of the distributed application; transforming, with one or more processors, the encrypted data encryption keys with proxy re-encryption based on the transformation key to form transformed encrypted data encryption keys, wherein: the transformed encrypted data encryption keys are decryptable with the second private cryptographic key, and the encrypted data encryption keys are not decryptable with the second private cryptographic key; obtaining, with one or more processors, the second private cryptographic key and the transformed encrypted data encryption keys in the untrusted portion of the distributed application; decrypting, with one or more processors, in the untrusted portion of the distributed application, a first transformed encrypted data encryption key among the transformed encrypted data encryption keys to obtain a first data encryption key among the plurality of data encryption keys;

and decrypting, with one or more processors, in the untrusted portion of the distributed application, a first encrypted record among the plurality of encrypted records with the first data encryption key.

2. The medium of embodiment 1, wherein: the proxy re-encryption is interactive proxy re-encryption, in which the transformation key is generated based on both the second public cryptographic key and the second private cryptographic key.

3. The medium of embodiment 1, wherein: the proxy re-encryption is non-interactive proxy re-encryption, in which the transformation key is generated without using the second private cryptographic key.

4. The medium of embodiment 3, wherein: the second public-private cryptographic key pair is generated outside of the trusted portion of the distributed application; and the trusted portion of the distributed application does not have access to the second private cryptographic key.

5. The medium of any one of embodiments 1-4, wherein: transforming the encrypted data encryption keys is performed in the untrusted portion of the distributed application after the transformation key is provided by the trusted portion of the distributed application to the untrusted portion of the distributed application.

6. The medium of any one of embodiments 1-4, wherein: transforming the encrypted data encryption keys is performed in the trusted portion of the distributed application; and the first encrypted record is decrypted without the transformation key being accessed by the untrusted portion of the distributed application.

7. The medium of any one of embodiments 1-6, wherein: encrypting the plurality of records is done with a first plurality of computing nodes executing at least part of the distributed application; and the first plurality of computing nodes are not in the trusted portion of the distributed application.

8. The medium of any one of embodiments 1-7, further comprising: decrypting, in the untrusted portion of the distributed application, the transformed encrypted data encryption keys to obtain the plurality of data encryption keys; and decrypting the plurality of encrypted records based on the decrypted data encryption keys with a plurality of computing nodes executing at least part of the distributed application to obtain the plurality of records, wherein at least some different computing nodes concurrently decrypt at least some different encrypted records.

9. The medium of any one of embodiments 1-8, wherein: the plurality of records comprises more than a million records; each of the plurality of records has a different data encryption key; and the distributed application executes on more than 10 computing devices on more than 100 computing nodes, each being a network host in a network on which at least part of the distributed application executes.

10. The medium of any one of embodiments 1-9, wherein: the distributed application implements a distributed file system in which the plurality of encrypted records are stored on a plurality of computing nodes; the records are files; each file is segmented into blocks; and the blocks are replicated on different ones of the computing nodes.

11. The medium of embodiment 10, wherein: each encrypted data encryption key is stored in a block of a respective file that is encrypted with a respective data encryption key of the respective encrypted data encryption key.

12. The medium of any one of embodiments 1-11, wherein: the distributed application is a distributed data storage and analysis application configured to concurrently apply a mapping function to the decrypted records on a plurality of computing nodes and then concurrently apply a reducing function to results of the mapping function on a plurality of computing nodes; and the distributed application stores records in encrypted form in a plurality of encryption zones, each having data encryption keys encrypted with different public-private cryptographic key pairs.

13. The medium of any one of embodiments 1-12, the operations comprising delegating access to a subset of the encryption zone to another entity different from an entity with access to the second private cryptographic key by: obtaining a third public cryptographic key in the trusted portion of the distributed application, wherein: the third public cryptographic key is a member of a third public-private cryptographic key pair including the third public cryptographic key and a corresponding third private cryptographic key, and the third public-private cryptographic key pair is different from the first public-private cryptographic key pair and the second public-private cryptographic key pair; generating another transformation key based on the first public-private cryptographic key pair and the third public cryptographic key, wherein the another transformation key is generated in the trusted portion of the distributed application; and transforming a subset of the encrypted data encryption keys with proxy re-encryption based on the transformation key to form another set of transformed encrypted data encryption keys, wherein: a first entity with access to the second private cryptographic key has access to all of the records in the encryption zone, and a second entity, different from the first entity, with access to the third private cryptographic key has access to a subset of the records in the encryption zone corresponding to the subset of the encrypted data encryption keys.

14. The medium of any one of embodiments 1-13, the operations comprising: partitioning the encrypted zone into a plurality of encrypted sub-zones each corresponding to different public-private cryptographic key pairs by generating transformation keys based on respective public cryptographic keys of the different public-private cryptographic key pairs.

15. The medium of any one of embodiments 1-14, wherein the operations comprise: instantiating a transformation node configured to form transformed encrypted data encryption keys with proxy re-encryption based on the transformation key; and instantiating local key management systems on computing nodes executing the untrusted portion of the distributed application, instances of the local key management system being configured to decrypted transformed encrypted data encryption keys locally, without sending the transformed encrypted data encryption keys to a centralized key management system of the distributed application before decrypting.

16. The medium of any one of embodiments 1-15, wherein: the distributed application includes a framework configured to call user-supplied code that specifies operations to be executed by the framework on data in the plurality of records; the framework comprises a key-management system; the framework is configured to protect the plurality records at rest with symmetric encryption based on one or more symmetric cryptographic keys stored in the key-management system; and the operations comprise transparently retrofitting the framework to protect the plurality of records with public-key encryption such that the same user-supplied code works in a retrofit version of the distributed application and in a pre-retrofitting version of the distributed application.

17. The medium of any one of embodiments 1-16, wherein obtaining the second public cryptographic key in the trusted portion of the distributed application comprises: obtaining a symmetric cryptographic key corresponding to the encryption zone from a key-management system of the distributed application; and deterministically generating the second public cryptographic key based on output of a one-way function that takes as input a value based on the symmetric key.

18. The medium of embodiment 17 wherein: deterministically generating the second public cryptographic key based on the output of a one-way function comprises deterministically generating a plurality of public-private cryptographic key pairs based on the symmetric cryptographic key; and the operation comprise: generating transformation keys for each of the plurality of the deterministically generated public-private cryptographic key pairs; and forming a plurality of encryption sub-zones of the encryption zone by transforming different subsets of the encrypted data encryption keys based on respective public cryptographic keys of the plurality of the deterministically generated public-private cryptographic key pairs.

19. The medium of embodiment 18, wherein respective public-private cryptographic key pairs among the deterministically generated plurality of public-private cryptographic key pairs are based on attributes of records in corresponding encryption sub-zones.

20. A method comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A tangible, non-transitory, machine-readable medium storing instructions that when executed by one or more processors effectuate operations comprising:
    obtaining, with one or more processors, a plurality of records associated with an encryption zone in a distributed application executing on a plurality of computing nodes;
    encrypting, with one or more processors, each of the plurality of records with a respective data encryption key among a plurality of data encryption keys to form a plurality of encrypted records;
    encrypting, with one or more processors, each of the plurality of data encryption keys with a first public cryptographic key to form encrypted data encryption keys, wherein:
        the first public cryptographic key is a member of a first public-private cryptographic key pair including the first public cryptographic key and a corresponding first private cryptographic key,
        the first public cryptographic key corresponds to the encryption zone,
        the distributed application comprises a trusted portion and an untrusted portion,
        the first private cryptographic key is unavailable to the untrusted portion of the distributed application, and
        the first private cryptographic key is available to at least part of the trusted portion of the distributed application;
    obtaining, with one or more processors, a second public cryptographic key in the trusted portion of the distributed application, wherein:
        the second public cryptographic key is a member of a second public-private cryptographic key pair including the second public cryptographic key and a corresponding second private cryptographic key, and
        the second public-private cryptographic key pair is different from the first public-private cryptographic key pair;
    generating, with one or more processors, a transformation key based on the first public-private cryptographic key pair and the second public cryptographic key, wherein the transformation key is generated in the trusted portion of the distributed application;
    transforming, with one or more processors, the encrypted data encryption keys with proxy re-encryption based on the transformation key to form transformed encrypted data encryption keys, wherein:
        the transformed encrypted data encryption keys are decryptable with the second private cryptographic key, and
        the encrypted data encryption keys are not decryptable with the second private cryptographic key;
    obtaining, with one or more processors, the second private cryptographic key and the transformed encrypted data encryption keys in the untrusted portion of the distributed application;
    decrypting, with one or more processors, in the untrusted portion of the distributed application, a first transformed encrypted data encryption key among the transformed encrypted data encryption keys to obtain a first data encryption key among the plurality of data encryption keys; and
    decrypting, with one or more processors, in the untrusted portion of the distributed application, a first encrypted record among the plurality of encrypted records with the first data encryption key.

2. The medium of claim 1, wherein:
the proxy re-encryption is interactive proxy re-encryption, in which the transformation key is generated based on both the second public cryptographic key and the second private cryptographic key.

3. The medium of claim 1, wherein:
the proxy re-encryption is non-interactive proxy re-encryption, in which the transformation key is generated without using the second private cryptographic key.

4. The medium of claim 3, wherein:
the second public-private cryptographic key pair is generated outside of the trusted portion of the distributed application; and
the trusted portion of the distributed application does not have access to the second private cryptographic key.

5. The medium of claim 1, wherein:
transforming the encrypted data encryption keys is performed in the untrusted portion of the distributed application after the transformation key is provided by the trusted portion of the distributed application to the untrusted portion of the distributed application.

6. The medium of claim 1, wherein:
transforming the encrypted data encryption keys is performed in the trusted portion of the distributed application; and
the first encrypted record is decrypted without the transformation key being accessed by the untrusted portion of the distributed application.

7. The medium of claim 1, wherein:
encrypting the plurality of records is done with a first plurality of computing nodes executing at least part of the distributed application; and
the first plurality of computing nodes are not in the trusted portion of the distributed application.

8. The medium of claim 1, further comprising:
decrypting, in the untrusted portion of the distributed application, the transformed encrypted data encryption keys to obtain the plurality of data encryption keys; and
decrypting the plurality of encrypted records based on the decrypted data encryption keys with a plurality of computing nodes executing at least part of the distributed application to obtain the plurality of records, wherein at least some different computing nodes concurrently decrypt at least some different encrypted records.

9. The medium of claim 1, wherein:
the plurality of records comprises more than a million records;
each of the plurality of records has a different data encryption key; and
the distributed application executes on more than 10 computing devices on more than 100 computing nodes, each being a network host in a network on which at least part of the distributed application executes.

10. The medium of claim 1, wherein:
the distributed application implements a distributed file system in which the plurality of encrypted records are stored on a plurality of computing nodes;
the records are files;
each file is segmented into blocks; and
the blocks are replicated on different ones of the computing nodes.

11. The medium of claim 10, wherein:
each encrypted data encryption key is stored in a block of a respective file that is encrypted with a respective data encryption key of the respective encrypted data encryption key.

12. The medium of claim 1, wherein:
the distributed application is a distributed data storage and analysis application configured to concurrently apply a mapping function to the decrypted records on a plurality of computing nodes and then concurrently apply a reducing function to results of the mapping function on a plurality of computing nodes; and
the distributed application stores records in encrypted form in a plurality of encryption zones, each having data encryption keys encrypted with different public-private cryptographic key pairs.

13. The medium of claim 1, the operations comprising delegating access to a subset of the encryption zone to another entity different from an entity with access to the second private cryptographic key by:
obtaining a third public cryptographic key in the trusted portion of the distributed application, wherein:
the third public cryptographic key is a member of a third public-private cryptographic key pair including the third public cryptographic key and a corresponding third private cryptographic key, and
the third public-private cryptographic key pair is different from the first public-private cryptographic key pair and the second public-private cryptographic key pair;
generating another transformation key based on the first public-private cryptographic key pair and the third public cryptographic key, wherein the another transformation key is generated in the trusted portion of the distributed application; and
transforming a subset of the encrypted data encryption keys with proxy re-encryption based on the transformation key to form another set of transformed encrypted data encryption keys, wherein:

a first entity with access to the second private cryptographic key has access to all of the records in the encryption zone, and
a second entity, different from the first entity, with access to the third private cryptographic key has access to a subset of the records in the encryption zone corresponding to the subset of the encrypted data encryption keys.

14. The medium of claim 1, the operations comprising:
partitioning the encrypted zone into a plurality of encrypted sub-zones each corresponding to different public-private cryptographic key pairs by generating transformation keys based on respective public cryptographic keys of the different public-private cryptographic key pairs.

15. The medium of claim 1, wherein the operations comprise:
instantiating a transformation node configured to form transformed encrypted data encryption keys with proxy re-encryption based on the transformation key; and
instantiating local key management systems on computing nodes executing the untrusted portion of the distributed application, instances of the local key management system being configured to decrypted transformed encrypted data encryption keys locally, without sending the transformed encrypted data encryption keys to a centralized key management system of the distributed application before decrypting.

16. The medium of claim 1, wherein:
the distributed application includes a framework configured to call user-supplied code that specifies operations to be executed by the framework on data in the plurality of records;
the framework comprises a key-management system;
the framework is configured to protect the plurality records at rest with symmetric encryption based on one or more symmetric cryptographic keys stored in the key-management system; and
the operations comprise transparently retrofitting the framework to protect the plurality of records with public-key encryption such that the same user-supplied code works in a retrofit version of the distributed application and in a pre-retrofitting version of the distributed application.

17. The medium of claim 1, wherein obtaining the second public cryptographic key in the trusted portion of the distributed application comprises:
obtaining a symmetric cryptographic key corresponding to the encryption zone from a key-management system of the distributed application; and
deterministically generating the second public cryptographic key based on output of a one-way function that takes as input a value based on the symmetric key.

18. The medium of claim 17 wherein:
deterministically generating the second public cryptographic key based on the output of a one-way function comprises deterministically generating a plurality of public-private cryptographic key pairs based on the symmetric cryptographic key; and
the operation comprise:
generating transformation keys for each of the plurality of the deterministically generated public-private cryptographic key pairs; and
forming a plurality of encryption sub-zones of the encryption zone by transforming different subsets of the encrypted data encryption keys based on respective public cryptographic keys of the plurality of the deterministically generated public-private cryptographic key pairs.

19. The medium of claim 18, wherein respective public-private cryptographic key pairs among the deterministically generated plurality of public-private cryptographic key pairs are based on attributes of records in corresponding encryption sub-zones.

20. The medium of claim 1, the operations comprising: steps for delegating access.

21. The medium of claim 1, the operations comprising: steps for rotating keys.

22. The medium of claim 1, the operations comprising: steps for partitioning an encryption zone.

23. The medium of claim 1, the operations comprising: steps for transparently retrofitting a distributed application to use public-key cryptography.

24. A method, comprising:
obtaining, with one or more processors, a plurality of records associated with an encryption zone in a distributed application executing on a plurality of computing nodes;
encrypting, with one or more processors, each of the plurality of records with a respective data encryption key among a plurality of data encryption keys to form a plurality of encrypted records;
encrypting, with one or more processors, each of the plurality of data encryption keys with a first public cryptographic key to form encrypted data encryption keys, wherein:
the first public cryptographic key is a member of a first public-private cryptographic key pair including the first public cryptographic key and a corresponding first private cryptographic key,
the first public cryptographic key corresponds to the encryption zone,
the distributed application comprises a trusted portion and an untrusted portion,
the first private cryptographic key is unavailable to the untrusted portion of the distributed application, and
the first private cryptographic key is available to at least part of the trusted portion of the distributed application;
obtaining, with one or more processors, a second public cryptographic key in the trusted portion of the distributed application, wherein:
the second public cryptographic key is a member of a second public-private cryptographic key pair including the second public cryptographic key and a corresponding second private cryptographic key, and
the second public-private cryptographic key pair is different from the first public-private cryptographic key pair;
generating, with one or more processors, a transformation key based on the first public-private cryptographic key pair and the second public cryptographic key, wherein the transformation key is generated in the trusted portion of the distributed application;
transforming, with one or more processors, the encrypted data encryption keys with proxy re-encryption based on the transformation key to form transformed encrypted data encryption keys, wherein:
the transformed encrypted data encryption keys are decryptable with the second private cryptographic key, and
the encrypted data encryption keys are not decryptable with the second private cryptographic key;
obtaining, with one or more processors, the second private cryptographic key and the transformed encrypted data encryption keys in the untrusted portion of the distributed application;
decrypting, with one or more processors, in the untrusted portion of the distributed application, a first transformed encrypted data encryption key among the transformed encrypted data encryption keys to obtain a first data encryption key among the plurality of data encryption keys; and
decrypting, with one or more processors, in the untrusted portion of the distributed application, a first encrypted record among the plurality of encrypted records with the first data encryption key.

* * * * *